US009862807B2

(12) United States Patent
Ma et al.

(10) Patent No.: US 9,862,807 B2
(45) Date of Patent: Jan. 9, 2018

(54) NANOFIBROUS SPONGY MICROSPHERES

(71) Applicant: The Regents of the University of Michigan, Ann Arbor, MI (US)

(72) Inventors: Peter X. Ma, Ann Arbor, MI (US); Zhanpeng Zhang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 489 days.

(21) Appl. No.: 14/507,523

(22) Filed: Oct. 6, 2014

(65) Prior Publication Data

US 2016/0096941 A1 Apr. 7, 2016

(51) Int. Cl.
*C08J 9/28* (2006.01)
*C08J 9/16* (2006.01)

(52) U.S. Cl.
CPC . *C08J 9/28* (2013.01); *C08J 9/16* (2013.01); *C08J 2201/0484* (2013.01); *C08J 2201/0522* (2013.01); *C08J 2205/044* (2013.01); *C08J 2207/10* (2013.01); *C08J 2300/206* (2013.01); *C08J 2367/04* (2013.01)

(58) Field of Classification Search
None
See application file for complete search history.

(56) References Cited

U.S. PATENT DOCUMENTS 5,718,921 A 2/1998 Mathiowitz et al.
8,268,344 B2 * 9/2012 Ma .................. A61K 9/0024
424/443
2010/0016538 A1 * 1/2010 Dubois ............... C08G 18/0895
528/80
2010/0247663 A1 9/2010 Day et al.
2011/0027376 A1 2/2011 Boey et al.
2012/0128752 A1 5/2012 Loo et al.
2012/0308825 A1 12/2012 Ma et al.
2014/0350692 A1 * 11/2014 Jabbari ............... A61K 9/0024
623/23.58

OTHER PUBLICATIONS

Wei, G., Jin, Q., Giannobile, W.V., and Ma, P. X. "Nano-fibrous Scaffold for Controllled Delevery of Recombinant Human PDGF-BB," in *Journal of Controlled Release*, 2006, vol. 112 pp. 103-110.
Zhang, Z., Hu, J., and Ma, P. X. "Nanofiber-based Delivery of Bioactive Agents and Stem Cells to Bone Sites" in *Advanced Drug Delivery review*, 2012, vol. 64, pp. 1129-1141.

(Continued)

*Primary Examiner* — Ronak Patel
(74) *Attorney, Agent, or Firm* — Dierker & Kavanaugh, P.C.

(57) ABSTRACT

A nanofibrous spongy microsphere includes porous walls that define an exterior of the microsphere and that extend through an interior of the microsphere. The porous walls consist of interconnected nanofibers and spaces formed between the interconnected nanofibers. A plurality of micro-scale pores are formed throughout the interior of the microsphere. Each of the micro-scale pores i) is partially defined by the porous walls, ii) has an interpore opening that opens to an adjacent micro-scale pores, and iii) has a diameter ranging from about 1 μm to about 100 μm. A total diameter of the microsphere ranges from about 5 μm to about 1000 μm.

16 Claims, 16 Drawing Sheets

(56) References Cited

OTHER PUBLICATIONS

Jin, Q., Wei, G., Lin, Z., Sugai, J., Lynch, S.E., Ma, P. X. and Giannobile, W. V. "Nanofibrous Scaffolds Incorporating PDGF-BB Microspheres Induce Chemokine Expression and Tissue Neogenesis in Vivo" in *PloS One*, vol. 3, pp. e1729.

Liu, X., Jin, X., Ma, P. X. "Nanofibrous Hollow Microspheres Self-Assembled from Star-Shaped Polymers as Injectable Cell Carriers for Knee Repair" in *Nature Materials*, 2011 vol. 10, pp. 398-406.

Liu, X., Ma, P. X. "The Nanofibrous Architecture of Poly(L-lactic Acid)-Based Functional Copolymers" in *NIH Public Access*, 2010, vol. 31 pp. 259-269.

Zhao, Y., Cai, Q., Jiang, J., Shuai, X., Bei, J., Chen C., Xi, F. "Synthesis and Thermal Properties of Novel Star-Shaped Poly(L-Lactide)s with Starburst PAMAM-OH Dendrimer Macroinitiator" in *Polymer* vol. 43, pp. 5819-5825.

\* cited by examiner

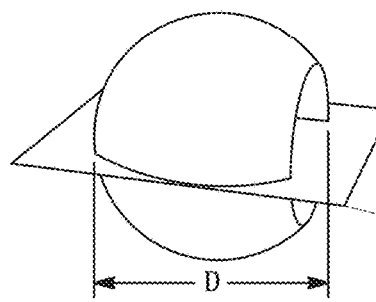
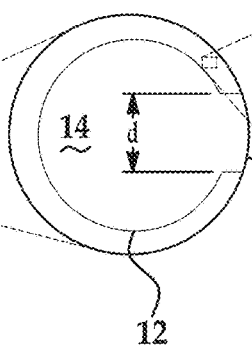
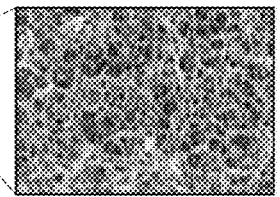
FIG. 1A    FIG. 1B    FIG. 1C
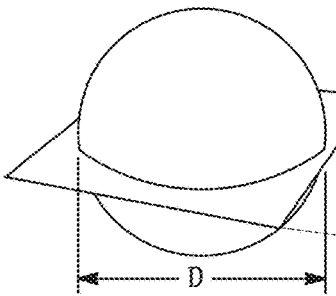
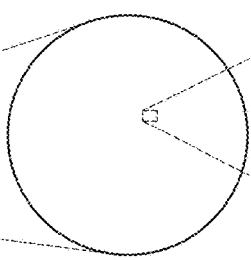
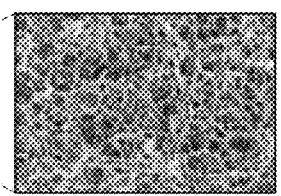
FIG. 2A    FIG. 2B    FIG. 2C
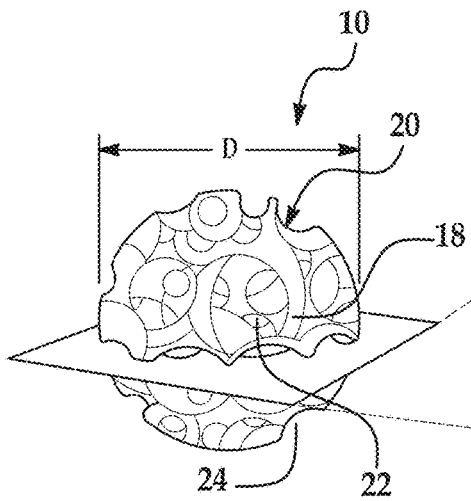
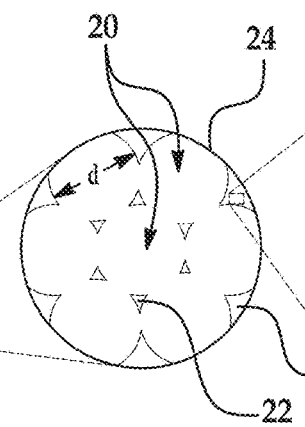
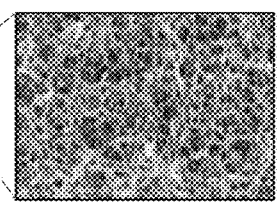
FIG. 3A    FIG. 3B    FIG. 3C

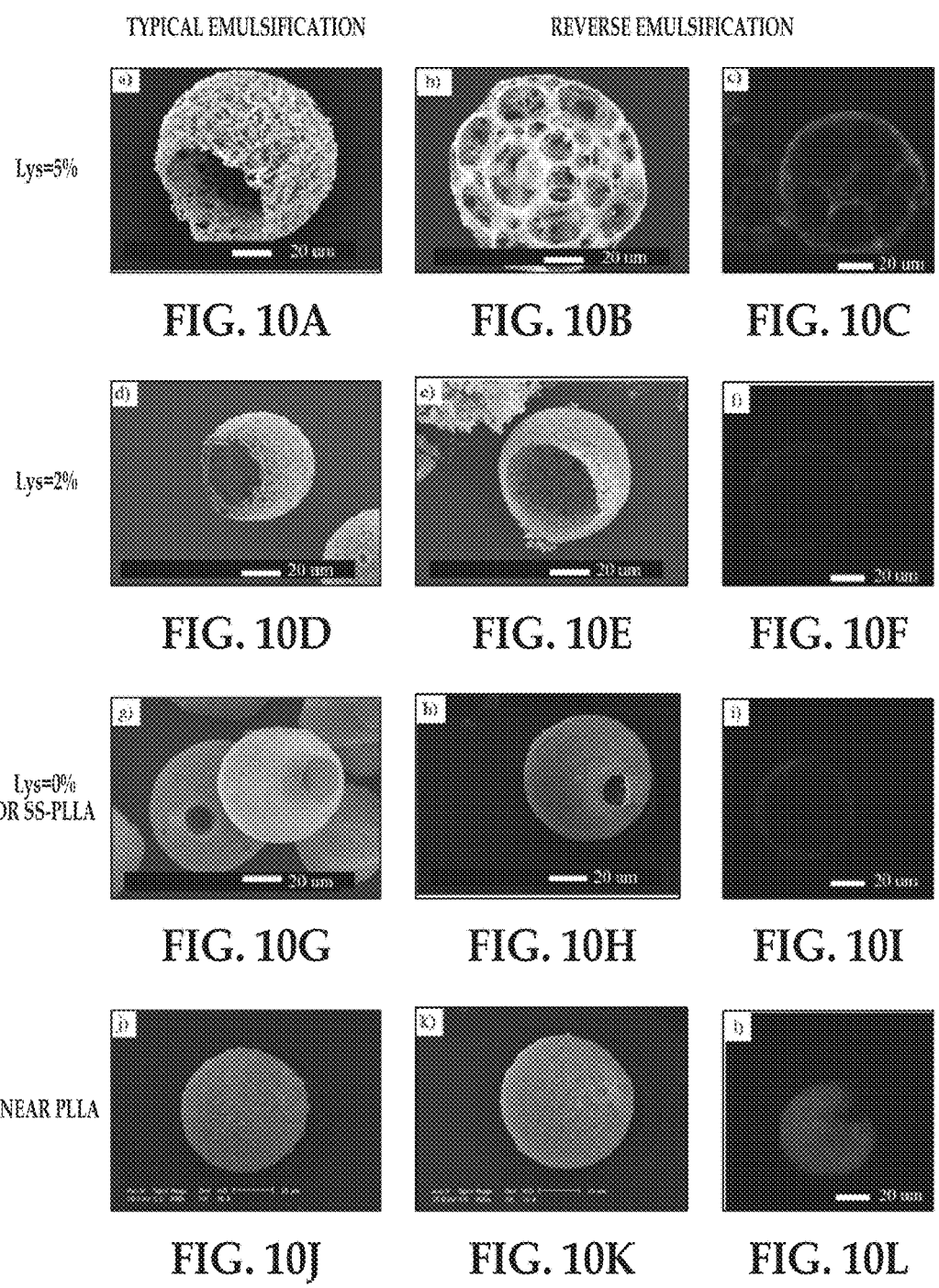

REVERSE EMULSIFICATION        TYPICAL EMULSIFICATION

2-ARM PLLA-400

2-ARM PLLA-200

2-ARM PLLA-100

2-ARM PLLA-200
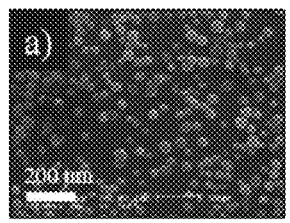 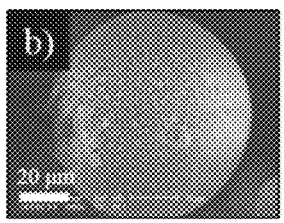 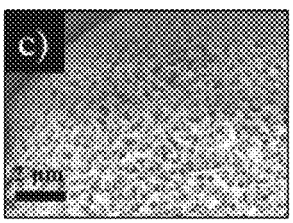
FIG. 13A     FIG. 13B     FIG. 13C
3-ARM PLLA-100
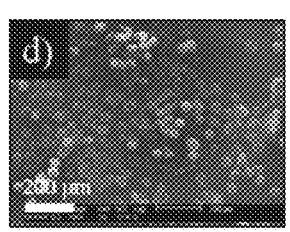 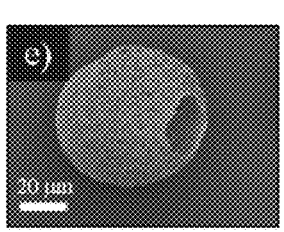 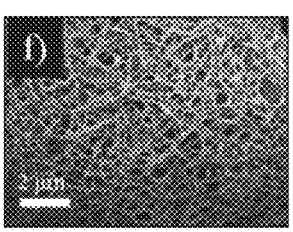
FIG. 13D     FIG. 13E     FIG. 13F
4-ARM PLLA-100
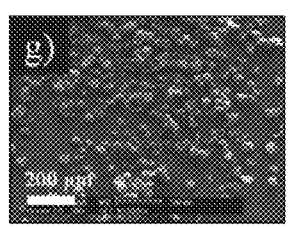 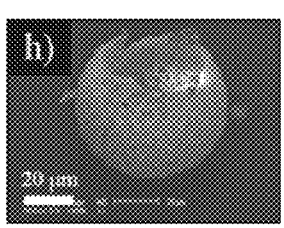 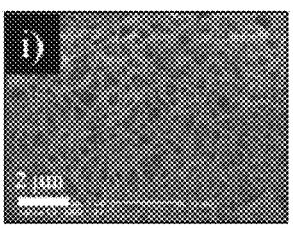
FIG. 13G     FIG. 13H     FIG. 13I
8-ARM PLLA-100
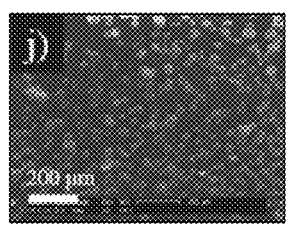 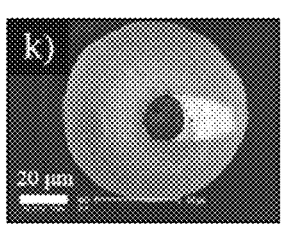 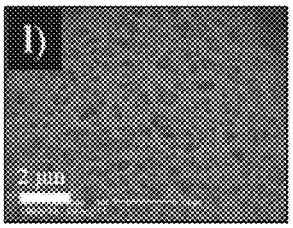
FIG. 13J     FIG. 13K     FIG. 13L
16-ARM PLLA-100
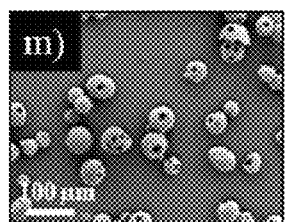 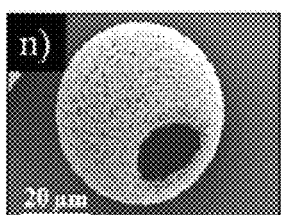 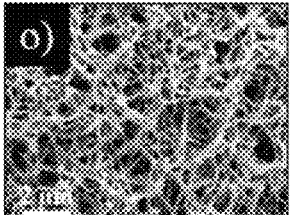
FIG. 13M     FIG. 13N     FIG. 13O

32-ARM PLLA-100

64-ARM PLLA-100

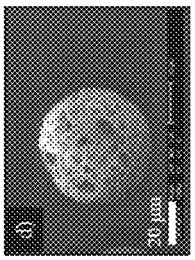
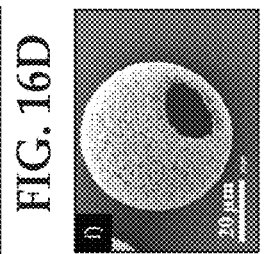
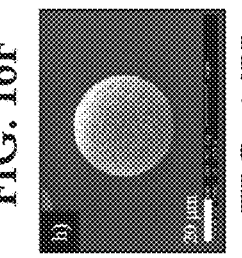
FIG. 16B  FIG. 16D  FIG. 16F  FIG. 16H
FIG. 16A  FIG. 16C  FIG. 16E  FIG. 16G
16-ARM PLLA-50  16-ARM PLLA-100  16-ARM PLLA-200  16-ARM PLLA-700
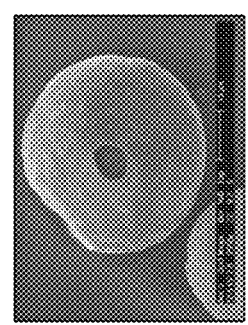
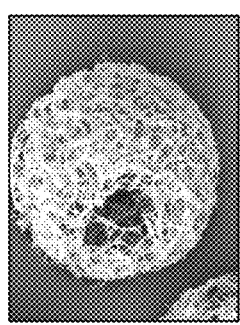
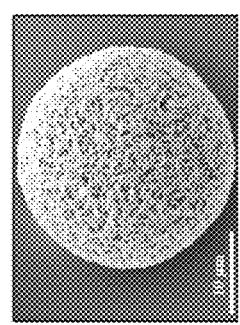
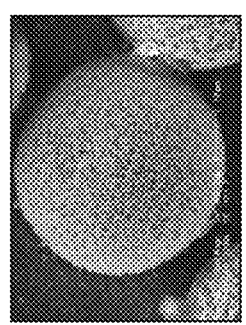
FIG. 15A  FIG. 15B  FIG. 15C  FIG. 15D
4-ARM PLLA-30  4-ARM PLLA-300  4-ARM PLLA-400  4-ARM PLLA-500

4-ARM
PLLA-400

4-ARM
PLLA-400-DIOL

16-ARM
PLLA-100

16-ARM
PLLA-100-DIOL

NANOFIBROUS SPONGY MICROSPHERES

STATEMENT REGARDING FEDERALLY SPONSORED RESEARCH OR DEVELOPMENT

This invention was made with government support under grant no. DMR-1206575 awarded by the National Science Foundation (NSF). The government has certain rights in the invention.

BACKGROUND

Synthesized biomaterials have been shown to be useful for engineering tissue regeneration and repair, at least in part because they recapitulate the physical characteristics of the biological tissue environment. For example, synthetic biomaterials have been generated with physical architecture that mimics the extracellular matrix (ECM). These biomaterials have been used as drug carriers and/or tissue engineering scaffolds. However, many of the available synthetic biomaterials are not able to deliver the biochemical cues of the natural ECM. For example, many synthetic biomaterials lack reactive sites for the presentation of desirable biochemical stimuli.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 1A through 1C respectively depict a schematic, perspective view of a nanofibrous hollow microsphere, a cross-sectional view taken along the plane shown in FIG. 1A, and an exploded view of nanofibers and spaces making up a shell of the nanofibrous hollow microsphere;

FIGS. 2A through 2C respectively depict a schematic, perspective view of a nanofibrous microsphere, a cross-sectional view taken along the plane shown in FIG. 2A, and an exploded view of nanofibers and spaces making up the nanofibrous microsphere;

FIGS. 3A through 3C respectively depict a schematic, perspective view of a nanofibrous spongy microsphere, a cross-sectional view taken along the plane shown in FIG. 3A, and an exploded view of nanofibers and spaces making up porous walls of the nanofibrous spongy microsphere;

FIGS. 10A through 10L are Scanning Electron Micrograph (SEM) images and confocal images of microspheres fabricated from star shaped poly(L-lactic acid)-block-poly(L-lysine) (SS-PLLA-b-PLYS) having a lysine content of 5% (FIGS. 10A-10C); SS-PLLA-b-PLYS having a lysine content of 2% (FIGS. 10D-10F); SS-PLLA-b-PLYS with a lysine content of 0% (FIGS. 10G-10I); and linear PLLA (FIGS. 10J-10L);

FIGS. 15A through 15D are SEM images of microspheres fabricated from 4-arm PLLA-50 (FIG. 15A), 4-arm PLLA-300 (FIG. 15B), 4-arm PLLA-400 (FIG. 15C), and 4-arm PLLA-500 (FIG. 15D);

FIGS. 16A through 16H are SEM images of the microspheres fabricated from 16-arm PLLA-50 (FIGS. 16A and 16B), 16-arm PLLA-100 (FIGS. 16C and 16D), 16-arm PLLA-200 (FIGS. 16E and 16F), and 16-arm PLLA-700 (FIGS. 16G and 16H);

FIG. 23A is H & E stained tissue, FIG. 23B is von Kossa stained tissue, and FIG. 23C is HIC-DSPP stained tissue; FIG. 23D is H & E stained tissue, FIG. 23E is von Kossa stained tissue, and FIG. 23F is HIC-DSPP stained tissue.

DETAILED DESCRIPTION

Figure 4:
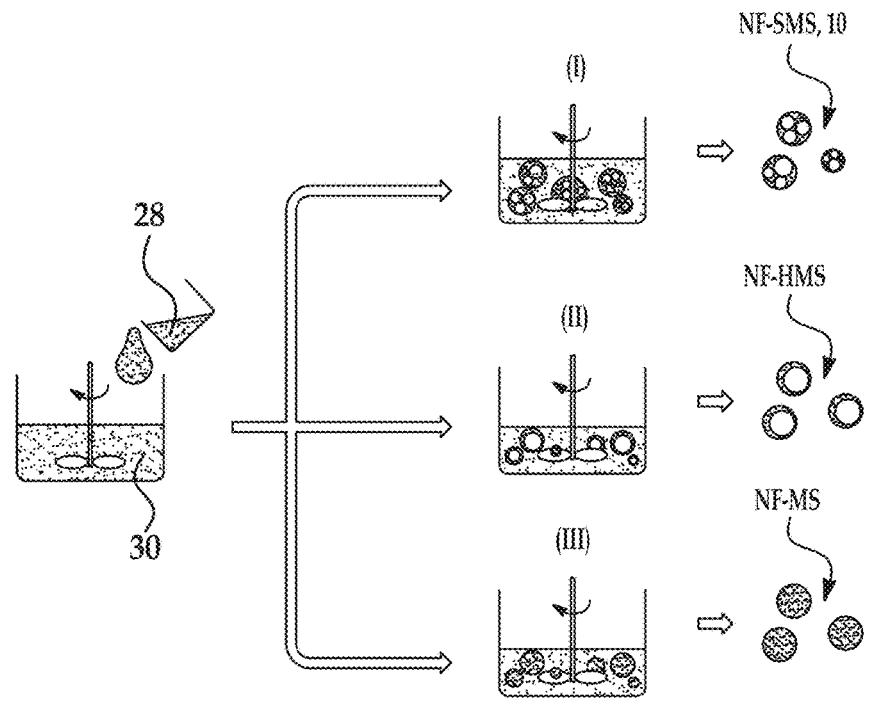
FIG. 4 schematically illustrates an example of a reverse emulsification process and various polymer types that may be used in the reverse emulsification process to form different types of microspheres.

Nanofibrous scaffolds, nanofibrous hollow microspheres, and nanofibrous microspheres have been generated from different materials in order to provide architectures that mimic the extracellular matrix (ECM). Each of these nanofibrous architectures is made up of interconnected nanofibers, where each nanofiber has a diameter ranging from about 1 nm to about 1000 nm.

A nanofibrous scaffold is characterized as a multi-level porous structure with regular spherical macro-scale pores (ranging from about 250 μm to about 425 μm in diameter), micro-scale interpore openings (i.e., openings that connect one macro-scale pore to another macro-scale pore) of about 100 μm, and spaces (less than 2 μm in diameter) between the nanofibers. While the pores of the scaffold are on the macro-scale or smaller, the scaffold itself has larger dimensions. For example, the thickness of the scaffold may be 1 mm or more, and the length and/or width of the scaffold may be 3 mm or more.

A nanofibrous hollow microsphere (NF-HMS) is characterized as a hollow structure having a single hollow core surrounded by a nanofibrous shell, and one or more openings formed in the nanofibrous shell. An example of the NF-HMS is shown in FIGS. 1A through 1C. FIG. 1A is a perspective, schematic view of the NF-HMS, which includes the nanofibrous shell having a single opening. The entire hollow structure has a diameter D ranging from about 5 μm to about 1000 μm. FIG. 1B is a cross-sectional, schematic view taken along the plane shown in FIG. 1A (noting that the bottom of the sphere is not shown for clarity). In particular, FIG. 1B schematically illustrates the nanofibrous shell 12, the hollow core 14, and the opening 16 formed in the nanofibrous shell 12. The diameter $d_{op}$ of the opening 16 ranges from about 5 μm to about 50 μm. FIG. 1C illustrates the nanofibers of the nanofibrous shell 12. As shown in FIG. 1C, the nanofibrous shell 12 also includes spaces (less than 2 μm in diameter) that are present between the nanofibers.

A nanofibrous microsphere (NF-MS) is characterized as a structure composed of nanofibers. An example of the NF-MS is shown in FIGS. 2A through 2C. FIG. 2A is a perspective, schematic view of the NF-MS, which does not include any openings. The entire structure has a diameter D ranging from about 5 μm to about 1000 μm. FIG. 2B is a cross-sectional, schematic view taken along the plane shown in FIG. 2A. In particular, FIG. 2B represents the fact that the nanofibers are present throughout the entire cross-section of the NF-HS. FIG. 2C illustrates the nanofibers and the spaces (less than 2 μm in diameter) present between the nanofibers.

The microspheres disclosed herein are similar to the nanofibrous scaffolds, nanofibrous hollow microspheres, and nanofibrous microspheres previously described because they also include a nanofibrous architecture or a partially nanofibrous architecture. The microspheres are also similar to the nanofibrous hollow microspheres (NF-HMS) and the nanofibrous microspheres (NF-MS) because each microsphere disclosed herein has a diameter D ranging from about 5 μm to about 1000 μm. In some examples, the diameter D of the entire hollow structure ranges from about 10 μm to about 1000 μm. However, the microspheres disclosed herein are unlike the nanofibrous scaffolds, nanofibrous hollow microspheres, and nanofibrous microspheres because they are spongy (i.e., nanofibrous spongy microspheres or NF-SMS). By "spongy," it is meant that the NF-SMS have a sponge-like architecture throughout the entirety of the microsphere. The sponge-like architecture includes interconnected porous walls and micro-scale pores formed among the interconnected porous walls. An example of the NF-SMS and its sponge-like architecture is shown in FIGS. 3A-3C.

FIG. 3A is a perspective, schematic view of the NF-SMS 10. The sponge-like architecture includes the porous walls 18 that extend through an interior of the NF-SMS 10 and also define an exterior of the NF-SMS 10. The porous walls 18 consist of interconnected nanofibers and spaces (less than 2 μm in diameter) formed between the interconnected nanofibers. The sponge-like architecture also includes a plurality of micro-scale pores 20 (ranging from about 1 μm to about 100 μm in diameter), interpore openings 22 (i.e., openings that connect one micro-scale pore 20 to another micro-scale pore 20), and, as previously mentioned, spaces between the nanofibers.

The micro-scale pores 20 are at least partially defined by the porous walls 18 and are formed throughout the NF-SMS 10. As such, some of the micro-scale pores 20 are positioned at the exterior of the NF-SMS 10 and others are positioned within the interior of the NF-SMS 10. Each micro-scale pore 20 has at least one interpore opening 22. The interpore opening 22 connects two adjacent micro-scale pores 20. In other words, the interpore opening 22 opens up one micro-scale pore 20 to another micro-scale pore 20. Each interpore opening 22 of the NF-SMS 10 ranges from about 2 μm to about 80 μm in diameter. Some of the micro-scale pores 20 also have an additional opening 24 that opens the micro-scale pore 20 to the environment surrounding the NF-SMS 10. It is to be understood that the micro-scale pores 20 positioned within the interior of the NF-SMS 10 include the interpore opening(s) 22 but do not include the additional opening(s) 24.

As illustrated in FIG. 3A, the exterior of the NF-SMS 10 is defined by some of the porous walls 18 and some of the micro-scale pores 20. As depicted, the exterior is not completely formed of nanofibers and spaces, which is unlike the NF-MS of FIG. 2A. While the exterior of the NF-SMS 10 may resemble the shell 12 with one or more openings 16 (like the NF-HMS of FIG. 1A), the NF-SMS 10 is unlike the NF-HMS because the openings 24 at the exterior of the NF-SMS 10 do not lead to a single hollow core.

FIG. 3B is a cross-sectional, schematic view taken along the plane shown in FIG. 3A (noting that the bottom portion of the sphere 10 is not shown for clarity). In particular, FIG. 3B schematically illustrates some of the nanofibrous porous walls 18, the micro-scale pores 20, the interpore openings 22, and the additional openings 24. As mentioned above, the diameter d of each micro-scale pore 20 ranges from about 1 µm to about 100 µm, or, in another example, from about 5 µm to about 100 µm. FIG. 3C illustrates the nanofibers of the porous walls 18. As shown in FIG. 3C, the porous walls 18 also include spaces (less than 2 µm in diameter) that are present between the nanofibers.

Nanofibrous scaffolds, nanofibrous hollow microspheres, and nanofibrous microspheres have been formed by phase separation and template leaching techniques or emulsification techniques in which glycerol is added to emulsify a polymer solution. It has been found that these techniques do not readily form the NF-SMS 10 disclosed herein. In fact, it has been found that specific polymer types may be used with specific methods to form the NF-SMS 10, and that other polymer types used with the specific methods result in the formation of nanofibrous hollow microspheres (NF-HMS) or nanofibrous microspheres (NF-MS) rather than NF-SMS 10. It has also been found that controlling specific characteristics of the specific polymer also controls the formation of nanofibers.

In the examples disclosed herein, it has been found that the specific polymer types that can form NF-SMS 10 are highly glycerol-philic, i.e., glycerol loving or have a high affinity towards glycerol. Some highly glycerol-philic polymers that are suitable for forming NF-SMS 10 using a reverse emulsification technique are not suitable for forming NF-SMS 10 using a traditional emulsification technique. Each of the glycerol-philic polymers that is suitable for forming NF-SMS 10 using the reverse emulsification technique is described in reference to FIG. 4, and each of the glycerol-philic polymers that is suitable for forming NF-SMS 10 using the traditional emulsification technique is described in reference to FIG. 5.

Referring now to FIG. 4, an example of the reverse emulsification process is depicted. The present inventors have found that when different polymers are used in the initial polymer solution 28, different microspheres are formed by the reverse emulsification process. In the reverse emulsification process, a polymer solution 28 is formed. The polymer solution 28 includes a suitable polymer (as will be described in more detail below) dissolved in a solvent. Examples of the solvent include tetrahydrofuran (THF), dimethyl formamide (DMF), pyridine, a THF-methanol mixture, a dioxane-methanol mixture, a dioxane-water mixture, a dioxane-acetone mixture, or a dioxane-pyridine mixture. The polymer may be dissolved in the solvent at a concentration ranging from about 1% (w/v) to about 5% (w/v). In an example, the polymer is dissolved in the solvent at a concentration of about 2% (w/v).

In the reverse emulsification process, the polymer solution 28 is quickly added to glycerol 30. As the polymer solution 28 is added, the mixture is stirred (e.g., using a magnetic stir bar or a mechanical stirrer). The temperature of the mixture may range from about 40° C. to about 70° C. In an example, the temperature of the mixture may be maintained at about 50° C. The polymer solution 28 is rapidly (e.g., within a few seconds) emulsified into polymer solution droplets, but there is no phase inversion. When a suitable highly glycerol-philic polymer is used, it is believed that multiple glycerol domains become entrapped inside one polymer solution droplet (phase I in FIG. 4). Other less glycerol-philic polymers (which include glycerol-phobic polymers) result in a single glycerol domain within the polymer solution droplet (phase II in FIG. 4) or no glycerol domains within the polymer solution droplet (phase III in FIG. 4).

Regardless of the type of polymer in the polymer solution 28, the reverse emulsification process then involves pouring the mixture into liquid nitrogen to induce phase separation. Phase separation is a thermodynamic process, in which a homogeneous multi-component system tends to self-assemble into multiple phases to lower system free energy. For polymer solutions, polymer-rich and polymer-lean phases will form during the self-assembly, with the former solidifying into a polymer skeleton and the latter becoming the void space during solvent extraction. As such, phase separation forms a polymer skeleton of the microsphere, as well as a liquid phase that includes glycerol and the solvent. The glycerol and the solvent are extracted from the polymer skeleton (e.g., by washing with water), and microspheres are formed. The type of polymer and solvent, as well as the solution concentration and solvent extraction processes, all play a role in the structure formation during phase separation. For example, certain polymers will form nanofibers, and other polymers will aggregate together.

The microspheres that are formed are freeze-dried.

The type of microsphere that is obtained depends, at least in part, upon the polymer used and the presence or absence of glycerol domain(s) during the reverse emulsification process. As mentioned above, to form NF-SMS 10, the polymer is highly glycerol-philic. Highly glycerol-philic polymers that have been found to be suitable for forming NF-SMS 10 using the reverse emulsification technique include: i) a star-shaped poly(L-lactic acid) having X number of hydroxyl groups, where X≥4, and having an original hydroxyl density of 1/Y, where Y is the feed ratio of a monomer used to form the polymer to the number of hydroxyls on an initiator used to form the polymer and where Y is ≥100; or ii) a star shaped poly(L-lactic acid)-block-poly(L-amino acid) having an amino acid (e.g., lysine) content or a peptide content (e.g., RGD (Arg-Gly-Asp)) greater than or equal to 5%; or iii) a graft copolymer with poly(L-lactic acid) (e.g., poly((hydroxyethyl)methacrylate)-graft-poly(L-lactic acid) (PHEMA-g-PLLA), poly((hydroxyethyl)propylmethacrylate)-graft-poly(L-lactic acid), poly((hydroxyethyl)butyl acrylate)-graft-poly(L-lactic acid), etc.).

Figure 6A:
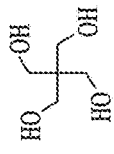
FIGS. 6A through 6C are the chemical structures of several different initiators for forming examples of the star-shaped poly(L-lactic acid) disclosed herein.
Figure 6C:
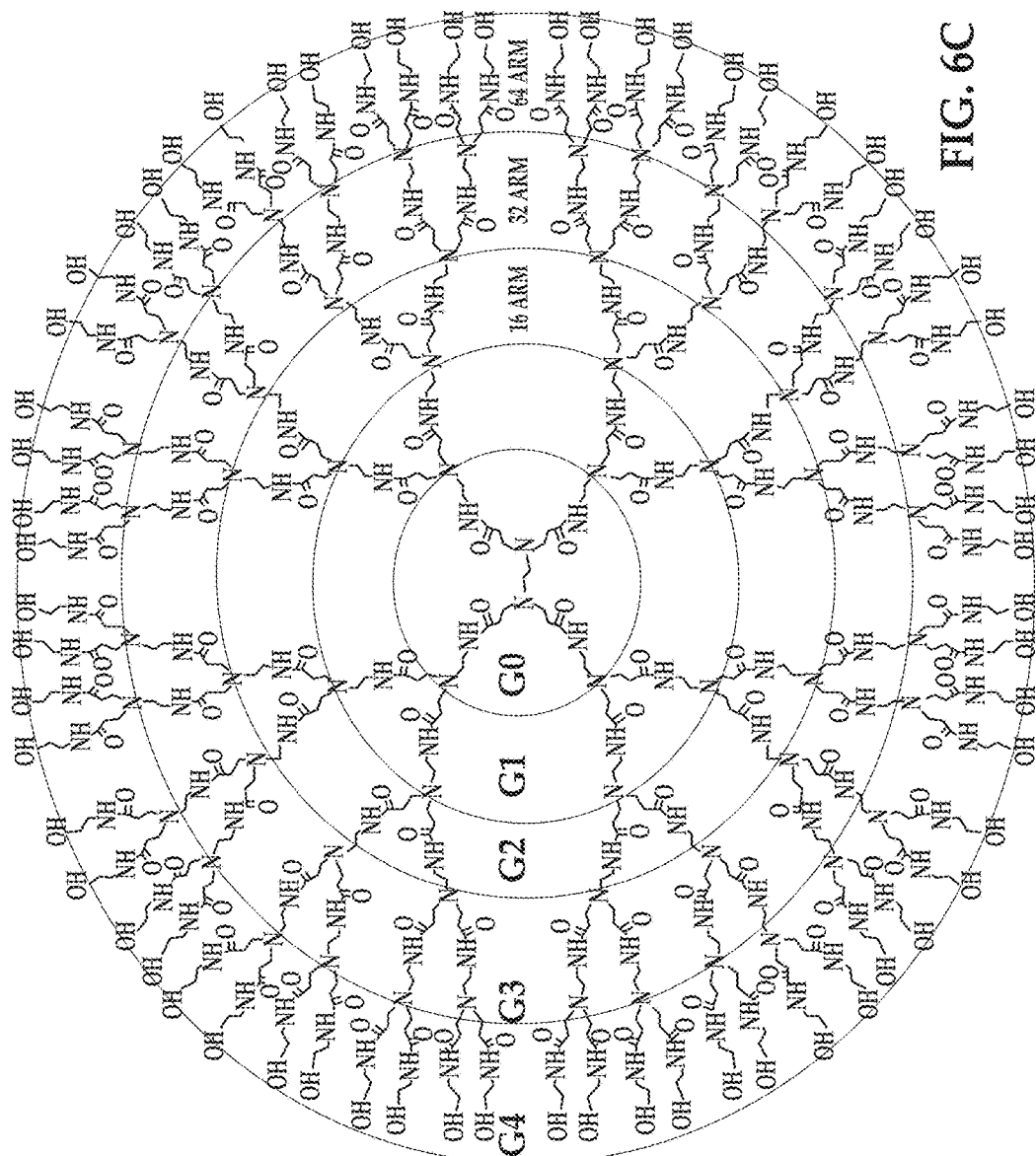
Figure 6B:
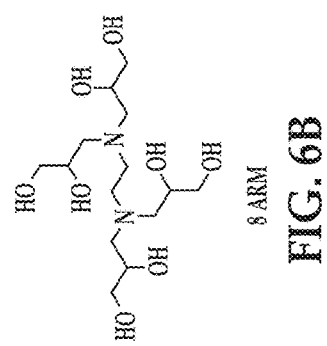

The star-shaped poly(L-lactic acid) having X≥4 hydroxyl groups and having the original hydroxyl density of 1/Y, where Y≥100, may be formed from a suitable initiator and a monomer, namely L-lactide. As mentioned above, X is the number of hydroxyl groups in the star-shaped poly(L-lactic acid). X is also the number of branches or arms that the star-shaped poly(L-lactic acid) has, which is determined by the number of initiating sites on the initiator. As such, the initiator that is selected has at least 4 initiating sites (i.e., hydroxyl groups) to polymerize L-lactide. As examples, to obtain 4-arm PLLA, 8-arm PLLA, 16-arm PLLA, 32-arm PLLA and 64-arm PLLA, respectively, initiators with 4, 8, 16, 32 and 64 initiating sites are selected. The chemical structures of these initiators are shown in FIGS. 6A through 6C. In particular, FIG. 6A shows pentaerythritol (a 4-arm/branch initiator), FIG. 6B shows N,N,N',N'-tetra(2,3-dihydroxypropyl)ethane-1,2-diamine (an 8-arm/branch initiator), and FIG. 6C shows poly(amido amine) (PAMAM) dendrimers, including generation 2.0 (a 16-arm/branch initiator), generation 3.0 (a 32-arm/branch initiator) and generation 4.0 (a 64-arm/branch initiator). Each of these initiators is commercially available. These initiators may also be synthesized. For example, the initiator with 8 hydroxyl end groups may be synthesized via the addition reaction between glycidol and ethylenediamine.

The formation of the star-shaped poly(L-lactic acid) involves ring-opening polymerization of L-lactide. The ring-opening polymerization of L-lactide may be conducted under anhydrous conditions to minimize side reactions. During the ring-opening polymerization, poly(L-lactic acid) polymers grow from the initiating sites of the selected initiator. The polymerization reaction results in the formation of the star-shaped poly(L-lactic acid), which includes the initiator at the core and poly(L-lactic acid) attached to each branch/arm of the initiator through the oxygen of the original hydroxyl (OH) group.

The average length of each branch/arm of the star-shaped poly(L-lactic acid) is associated with the feed ratio, Y, of the monomer to the number of hydroxyls on the initiator. As such, the average length of each branch/arm may be tailored by adjusting the monomer to initiator ratio. The characterization of some star-shaped poly(L-lactic acid) polymers is shown in Table 1. In Table 1, the star-shaped poly(L-lactic acid) is shown as X-arm PLLA-Y, where X is the number of hydroxyls and Y is the average arm length. The average molecular weights (MWs) of each arm and total MWs of the star-shaped poly(L-lactic acid) polymers were determined by proton Nuclear Magnetic Resonance (NMR) ($^1$H NMR) and Gel Permeation Chromatography (GPC).

may be represented by [OH]/[M], or, as noted above, 1/Y. If the star-shaped poly(L-lactic acid) is subsequently exposed to chemical modification to increase the number of hydroxyl groups, the hydroxyl density of the polymer may be increased (e.g., doubled), and this is referred to herein as the increased hydroxyl density. When referring to the hydroxyl groups on the initiator in terms of original hydroxyl density, it is to be understood that the hydroxyl groups on each arm of the initiator as well as any hydroxyl groups on the core of the polymer (i.e., any unreacted sites of the initiator due to steric hindrance during polymerization) are included. As such, the hydroxyl density is not affected by the steric hindrance during polymerization, and thus is determined by the feeding ratio during synthesis.

It is believed that X-arm (X≥8) PLLA Y (Y≥100) may be particularly suitable for use in the reverse emulsification process. Some specific examples of the star-shaped poly(L-lactic acid) for use in the reverse emulsification process to form NF-SMS 10 include 16-arm PLLA-100, 16-arm PLLA-150, 32-arm PLLA 100, 32-arm PLLA 150, 64-arm-PLLA 100 and 64-arm-PLLA 150.

As mentioned above, other suitable highly glycerol-philic polymers that may be used in the reverse emulsification process to form NF-SMS 10 include block copolymers of

TABLE 1

Preparation of Star-shaped Polymers PLLA with Varying Arm Numbers[a] and Characterization of Molecular Weight and Molecular Weight Distribution

| samples | initiator[b] | functional groups | [M]/[OH][c] | molecular weight $M_{n,each}$[d] | $M_{n,total}$[e] | $M_w/M_n$[f] |
|---|---|---|---|---|---|---|
| 4-arm PLLA-50 | Pentaerythritol | 4 | 50 | 5100 | 15400 | 1.48 |
| 4-arm PLLA-100 | | | 100 | 7300 | 21800 | 1.44 |
| 4-arm PLLA-300 | | | 300 | 16800 | 56600 | 1.50 |
| 4-arm PLLA-400 | | | 400 | 28500 | 108900 | 1.49 |
| 8-arm PLLA-300 | N,N,N',N'-tetra(2,3-dihydroxpropyl)ethane-1,2-diamine | 8 | 300 | 13100 | 84100 | 1.41 |
| 16-arm PLLA-50 | PAMAM | 16 | 50 | 3300 | 33400 | 1.34 |
| 16-arm PLLA-100 | dendrimer | | 100 | 5400 | 61000 | 1.41 |
| 16-arm PLLA-200 | (G$_2$-OH) | | 200 | 6700 | 70100 | 1.45 |
| 16-arm PLLA-500 | | | 500 | 8300 | 98500 | 1.51 |
| 16-arm PLLA-700 | | | 700 | 12500 | 112000 | 1.58 |
| 32-arm PLLA-100 | PAMAM | 32 | 100 | 4800 | 92000 | 1.36 |
| 32-arm PLLA-600 | dendrimer | | 600 | 9700 | 142000 | 1.54 |
| 32-arm PLLA-700 | (G$_3$-OH) | | 700 | 10400 | 162300 | 1.46 |
| 64-arm PLLA-100 | PAMA | 64 | 100 | 4400 | 190000 | 1.62 |
| 64-arm PLLA-200 | PAMAM | | 200 | 5200 | 210000 | 1.56 |
| 64-arm PLLA-400 | dendrimer | | 400 | 7500 | 342000 | 1.61 |
| 64-arm PLLA-600 | (G$_4$-OH) | | 600 | 9300 | 421000 | 1.53 |
| 64-arm PLLA-700 | | | 700 | 9700 | 418000 | 1.68 |

[a]The polymerization conditions: [Sn(Oct)$_2$]/[LA] = 1/500, at 135° C. for 24 h.
[b]Structures of the initiators are listed in FIGS. 6A-6C.
[c][M]/[OH] refers to the feed ratio of L-lactide monomer to OH groups on the initiator.
[d]Number average molecular weight of each arm estimated by comparison of the integrals of methine protons and the terminal methine in PLLA from $^1$H NMR spectra.
[e,f]Obtained from GPC analysis using polystyrene as standard and THF as eluent.

As mentioned above, the star-shaped poly(L-lactic acid) also has an original hydroxyl density of 1/Y, where Y is greater than or equal to (≥) 100. As such, the original hydroxyl density is less than or equal to 1/100. In an example, the original hydroxyl density of the star-shaped poly(L-lactic acid) suitable for use in the reverse emulsification process ranges from 1/150 to 1/100. The term "original hydroxyl density" refers to the molar ratio of hydroxyl groups on the initiator to L-lactic acid monomer used to form the star-shaped poly(L-lactic acid), prior to any chemical modification of the polymer. The original hydroxyl density poly(L-lactic acid) with amino acid(s) or peptides. The resulting star shaped poly(L-lactic acid)-block-poly(L-lysine) (SS-PLLA-b-PLYS) or star shaped poly(L-lactic acid)-block-poly(peptide) (SS-PLLA-b-PEP) has, respectively, an amino acid (e.g., lysine) or peptide content greater than or equal to 5%. SS-PLLA-b-PLYS or SS-PLLA-b-PEP can stabilize multiple glycerol domains in a single polymer solution droplet to form the NF-SMS 10 during reverse emulsification (phase I in FIG. 4). The present inventors have found that the PLYS block or the peptide block has to be long enough to enable the stabilization of phase (I) in FIG. 4, and that the long enough PLYS or peptide block can be obtained when the amino acid or peptide content is at or exceeds 5%. In particular, the PLYS block consists of repeating units of lysine, which increase the glycerol-philicity of the polymer through the amino groups.

Figure 7A:
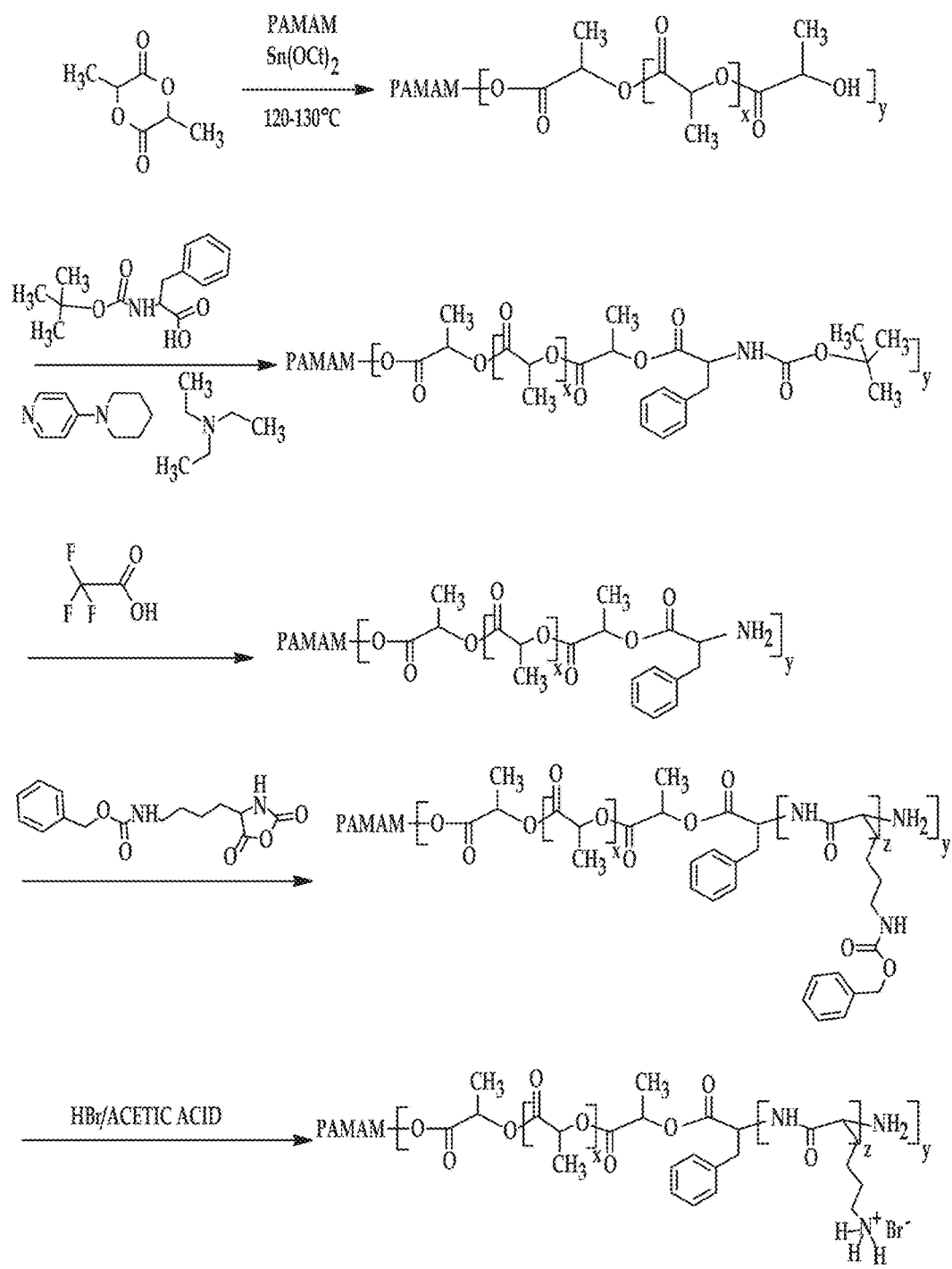
FIG. 7A depicts an example of the synthesis of star shaped poly(L-lactic acid)-block-poly(L-lysine) (SS-PLLA-b-PLYS)

An example of the synthesis procedure of SS-PLLA-b-PLYS is shown in FIG. 7A. L-lactide may polymerize from the hydroxyl groups on a poly(amido amine) (PAMAM) dendrimer, and then reacted with several compounds to introduce the lysine block.

When the amino acid or peptide content is less than 5%, the copolymer cannot stabilize multiple glycerol domains in a single polymer solution droplet, but rather stabilizes one glycerol domain in one polymer solution droplet (phase II in FIG. 4), which forms nanofibrous hollow microspheres (NF-HMS). Linear PLLA does not include any groups that have an affinity towards glycerol, and thus is considered to be glycerol-phobic. Linear PLLA cannot stabilize either multiple or single glycerol domains inside the single polymer solution droplet, and thus forms nanofibrous (non-hollow) microspheres (NF-MS) when used in the reverse emulsification process. Phases II and III in FIG. 4 illustrate that the reverse emulsification process is not suitable for simply any lysine-containing polymer.

The SS-PLLA-b-PLYS or SS-PLLA-b-PEP copolymers disclosed herein may also be blended with poly-DL-lactide (PDLLA) or poly(lactic-co-glycolic acid) (PLGA). In examples in which a blend of polymers and/or copolymers is used, the total amount of polymer and/or copolymer used forms a polymer solution with a concentration ranging from about 1% w/v to about 5% w/v. It is to be understood that a higher amount of PLGA will decrease the percentage of the nanofibrous structure.

Figure 7B:
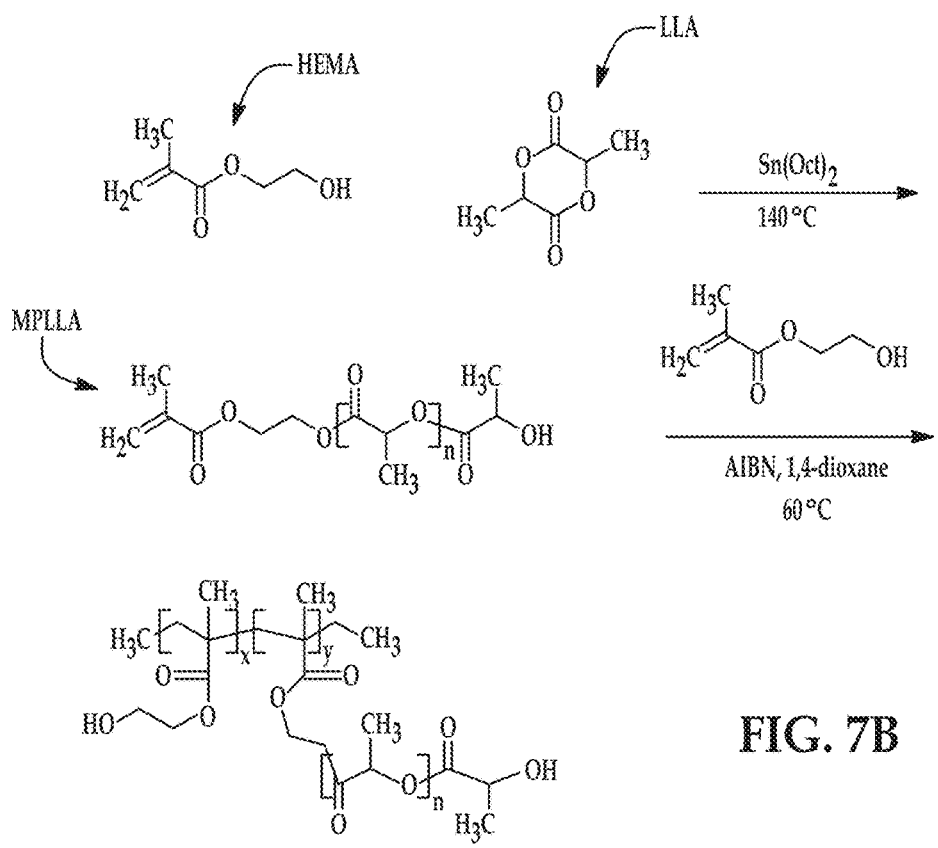
FIG. 7B depicts an example of the synthesis of poly((hydroxyethyl)methacrylate)-graft-poly(L-lactic acid) (PHEMA-g-PLLA)

Also as mentioned above, yet other suitable highly glycerol-philic polymers include graft copolymers with poly(L-lactic acid). Examples of the graft copolymers include poly((hydroxyethyl)methacrylate)-graft-poly(L-lactic acid) (PHEMA-g-PLLA), poly((hydroxyethyl)propylmethacrylate)-graft-poly(L-lactic acid), and poly((hydroxyethyl)butyl acrylate)-graft-poly(L-lactic acid). PHEMA-g-PLLA may be made from monomers of L-lactide and (hydroxyethyl) methacrylate (HEMA). An example of the synthesis procedure of PLLA-g-PHEMA is shown in FIG. 7B. As shown in the first step in FIG. 7B, HEMA is used as an initiator for the ring-opening polymerization of L-lactide (LLA) to create a macromonomer (MPLLA). The MPLLA is then copolymerized with HEMA (serving as a monomer in this step) through free radical polymerization. The PHEMA block (or other hydroxyethyl (meth)acrylate block) introduces hydroxyl functionality into the PLLA based copolymer, and thus increases its affinity to glycerol. PLLA-g-PHEMA can stabilize multiple glycerol domains in a single polymer solution droplet to form the NF-SMS 10 during reverse emulsification (phase I in FIG. 4).

Figure 5:
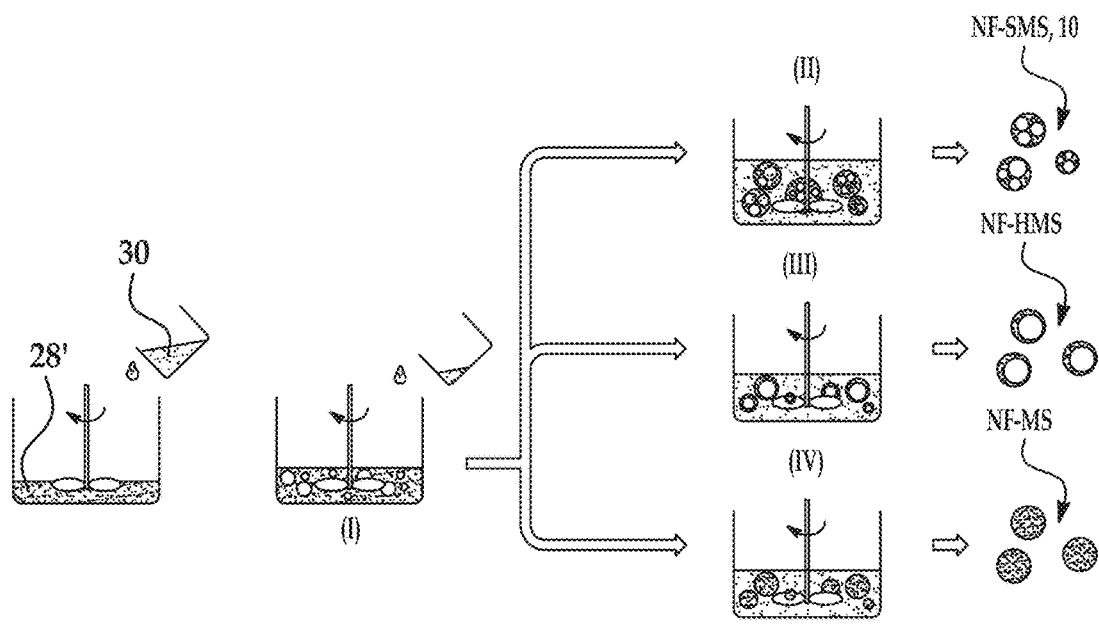
FIG. 5 schematically illustrates an example of a traditional emulsification process and various polymer types that may be used in the traditional emulsification process to form different types of microspheres.

The group of highly glycerol-philic polymers described herein for use in the reverse emulsification process is generally not suitable for use in a typical emulsification process in which the glycerol 30 is added to the polymer solution 28'. The typical emulsification process is shown in FIG. 5, and will now be described. In the typical emulsification process, a polymer solution 28' is formed. The polymer solution 28' includes a suitable polymer (as will be described in more detail below) dissolved in a solvent. Any examples of the solvent previously described may be used. The polymer may be dissolved in the solvent at a concentration ranging from about 1% (w/v) to about 5% (w/v). In an example, the polymer is dissolved in the solvent at a concentration of about 2% (w/v).

Figure 8:
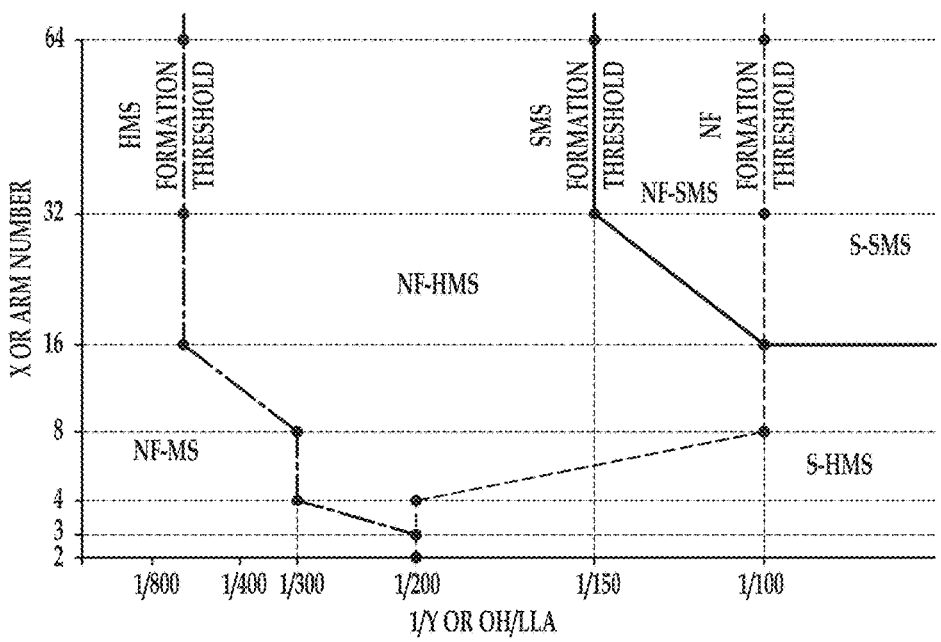
FIG. 8 is a phase diagram illustrating the various microstructures that may be formed using a typical emulsion process as a function of X (arm number) and 1/Y (original hydroxyl density or ([OH]/[M])) of star-shaped poly(L-lactic acid)

For the polymer solution 28', the present inventors have found that a particular subset of star-shaped poly(L-lactic acid) polymers is capable of forming NF-SMS 10 when the typical emulsification is used. Star-shaped poly(L-lactic acid) polymers outside of this subset may form other microspheres. FIG. 8 is a phase diagram illustrating the microsphere structure that forms using a typical emulsification process as a function of X (shown along the Y axis) and 1/Y (shown along the X axis).

As illustrated in FIG. 8, an increased hydroxyl density [OH]/[M] favors the formation of a hollow or even porous/spongy structure within the microspheres when typical emulsification is used. More particularly, NF-SMS 10 may be formed when X is greater than 16 and 1/Y ranges from 1/150 to 1/100. When X is greater than or equal to 16, an even higher hydroxyl density (e.g., 1/80) also results in the porous architecture, except the nanofibers become aggregated. The formation of the porous/spongy architecture may be due to the good affinity between the hydroxyl groups and glycerol. It is believed that SS-PLLA with a high hydroxyl density could serve as a surfactant to assemble at the interface between different phases and provide a suitable stabilizing force.

As illustrated in FIG. 8, the threshold hydroxyl density (1/Y) for forming the interconnected nanofibrous structure (as opposed to fibers that are aggregated together to form a solid structure, such as solid microspheres with multiple holes or solid, hollow microspheres S-HMS) is 1/100. In other words, the arm length of the polymer (which is associated with the ratio Y) needed to form the nanofibrous walls, shells, etc. is at least 100. Following FIG. 8, Table 2 below illustrates some example of combinations of X and 1/Y that may be selected for the polymer that can be used to form NF-SMS 10 with the typical emulsification process.

TABLE 2

X and 1/Y Combinations for forming
NF-SMS using Typical Emulsification

| X-arm PLLA-Y | X | [OH]/[M] |
|---|---|---|
| 24-arm PLLA-125 | 24 | 1/125 |
| 32-arm PLLA-150 | 32 | 1/150 |
| 64-arm PLLA-150 | 64 | 1/150 |

Also as illustrated in FIG. 8, the threshold hydroxyl density (1/Y) for forming the spongy or porous structure is 1/150 when X is 32 or more. FIG. 8 clearly illustrates that by changing X and/or 1/Y of the polymer to be used in the typical emulsification process, one can control the structure of the entire microsphere (non-hollow versus hollow versus porous) as well as the structure of the fibers making up the microsphere (interconnected nanofibers versus aggregated fibers).

As illustrated in FIG. 8, the select few of the star-shaped poly(L-lactic acid) polymers that can be used to form NF-SMS 10 during typical emulsification include star-shaped poly(L-lactic acid)s having X number of hydroxyl groups, wherein X>16, and having an original hydroxyl density, 1/Y, ranging from 1/100 to 1/150. It has been found that other polymers that are suitable for forming NF-SMS 10 with reverse emulsification, such as SS-PLLA-b-PLYS and PLLA-g-PHEMA, are not suitable for forming NF-SMS 10 with typical emulsification. Rather, when typical emulsification is used with either SS-PLLA-b-PLYS or PLLA-g-PHEMA, NF-HMS, are formed.

Referring back to FIG. 5, in the traditional emulsification process, glycerol 30 is slowly added to the polymer solution 28' (including the star-shaped poly(L-lactic acid) polymer from the previously described subset). As the glycerol 30 is added, the mixture is stirred (e.g., using a magnetic stir bar or a mechanical stirrer). In the typical emulsification method, the added glycerol 30 is initially the dispersed phase (phase (I) FIG. 5). As the addition of glycerol 30 continues, the amount of glycerol 30 increases and exceeds the volume of polymer solution 28'. Therefore, phase inversion occurs, where the polymer solution 28' becomes the new dispersed phase (e.g., phases (II), (III), (IV) in FIG. 5). Phase inversion may cause the initial dispersed phase of glycerol 30 to be entrapped inside polymer solution droplets (as shown in phases (II) and (III) in FIG. 5). The phase that is achieved will depend upon the polymer that is used.

Regardless of the type of polymer in the polymer solution 28', the typical emulsification process then involves pouring the mixture into liquid nitrogen to induce phase separation. As previously described, phase separation forms a polymer skeleton of the microsphere, as well as a liquid phase that includes glycerol and the solvent. The glycerol and the solvent are extracted from the polymer skeleton (e.g., by washing with water), and microspheres are formed. The microspheres are freeze-dried.

Figure 9:
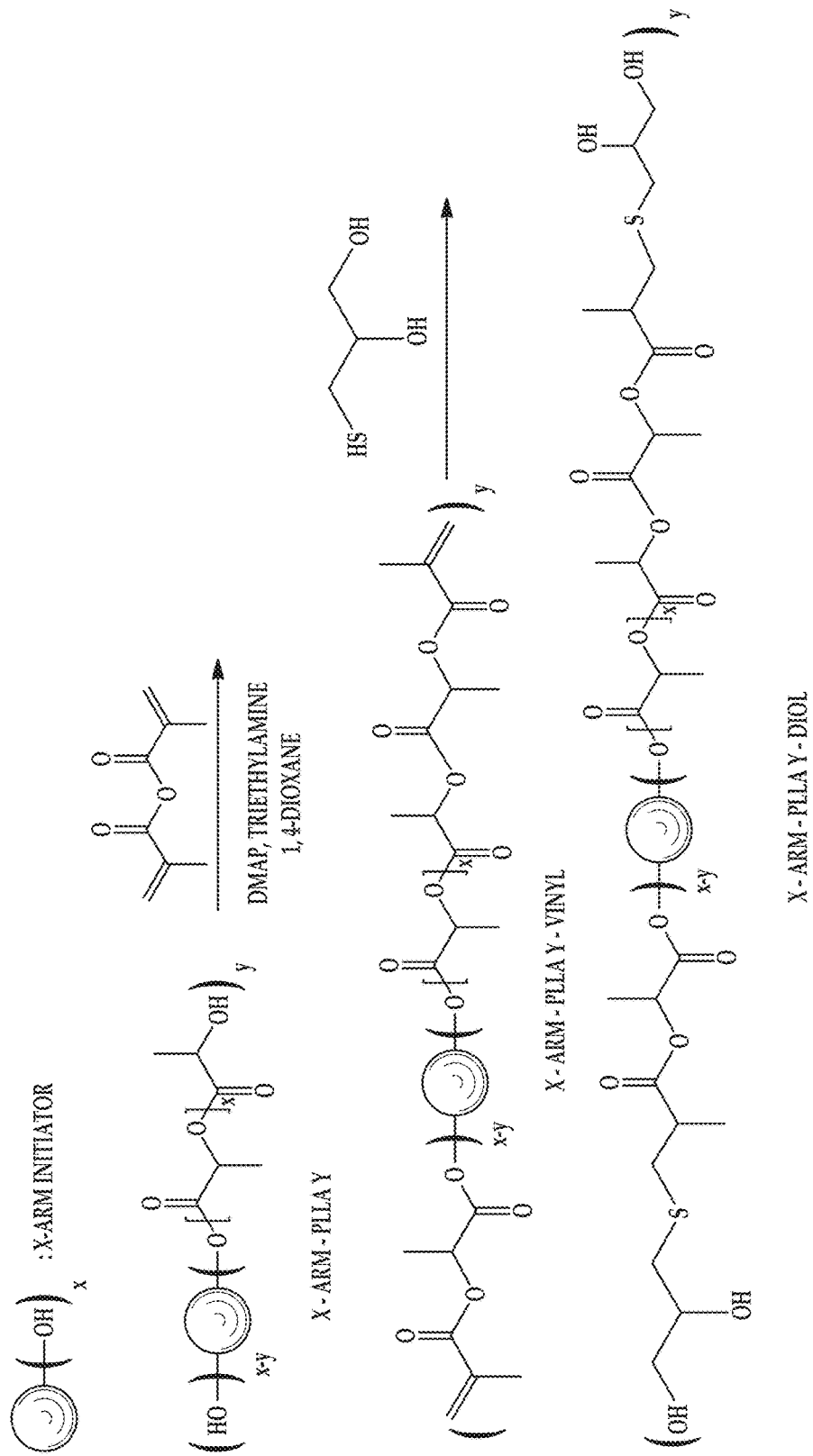
FIG. 9 depicts an example of a hydroxyl doubling reaction.

In the examples disclosed herein, the hydroxyl groups on the star-shaped poly(L-lactic acid) at least partially contribute to the hollow or porous structure formation within different examples of the microspheres. As such, it may be desirable to increase the number of hydroxyl groups on the star-shaped polymers without changing the arm length (Y) or arm number (X), so that nanofiber formation is not deleteriously affected. In order to increase the number of hydroxyl groups, the star-shaped poly(L-lactic acid) may be exposed to a hydroxyl doubling reaction. An example of this reaction is shown in FIG. 9. As illustrated, the hydroxyl groups on the polymer (X-arm-PLLA-Y) may first be converted into vinyl groups by reacting the polymer (X-arm-PLLA-Y) with methacrylic anhydride in a mixture of 4-dimethylamino pyridine (DMAP), triethylamine and 1,4-dioxane. The polymer with the vinyl groups (X-arm-PLLA-Y-vinyl) may then be reacted with 1-thioglycerol through a thiol-ene click reaction. After the modification, the number of hydroxyl groups is doubled (X-arm-PLLA-Y-diol), and thus the original hydroxyl density is also doubled. The doubled hydroxyl density is referred to herein as the increased hydroxyl density. The increased hydroxyl density is the molar ratio of hydroxyl groups on the polymer after the doubling reaction to L-lactic acid monomer used to form the polymer. In an example, the star-shaped polymer may be 16-arm PLLA-100, having $X=16$ and $Y=100$, and thus having an original hydroxyl density $1/Y=1/100$. Through the hydroxyl doubling reaction, an increased hydroxyl density of 1/50 can be achieved, without altering the arm number (i.e., $X=16$) or the arm length (i.e., $Y=100$). As noted above, the value of Y represents the ratio of the monomer used to form the polymer to the number of hydroxyls on the initiator used to form the polymer, and thus does not change, even though the number of hydroxyls on the final polymer has changed. As such, through the hydroxyl doubling reaction, the increased hydroxyl density is doubled when compared to the original hydroxyl density, without changing the X and Y values of the star-shaped polymer.

The nanofibrous spongy microspheres NF-SMS 10 may be used in a variety of applications, including cell and biomolecule delivery, as well as biocatalysis, separation, cosmetics, food additives, and other applications. The nanofibrous spongy microspheres NF-SMS 10 are injectable, and thus may be used in vivo. In an example, the nanofibrous spongy microspheres NF-SMS 10 may be soaked in alcohol (e.g., a 70% solution of ethanol) to pre-wet the microspheres NF-SMS 10. The pre-wet microspheres NF-SMS 10 may be exchanged with phosphate-buffered saline, and then washed with a cell culture medium. An example of the cell culture medium includes human dental pulp stem cells in α-modified essential medium, which may or may not be supplemented with 10% fetal bovine serum. The microspheres NF-SMS 10 in the cell culture medium may be stirred. Seeding of the cells may take place for 24 hours or more. In some examples, the medium may be changed over time (e.g., after 2 days of seeding). In the example provided, the seeded microspheres NF-SMS 10 may then be used, for example, to regenerate dental pulp-like tissues in vivo. The NF-SMS 10 may be particularly desirable for cell seeding and tissue regeneration because the surface area is relatively large, due to the porous walls 18 extending throughout the entirety of the NF-SMS 10. In another example, the nanofibrous spongy microspheres NF-SMS 10 may be seeded with bone marrow stem cells in order to regenerate cartilage in vivo.

To further illustrate the present disclosure, examples are given herein. As is described herein and will be illustrated in the following examples, the selection of polymers and emulsification process disclosed herein enables controllable phase separation both at the nano- and micro-scale. It is to be understood that these examples are provided for illustrative purposes and are not to be construed as limiting the scope of the present disclosure.

EXAMPLES

Example 1—SS-PLLA-b-PLYS

Linear PLLA, star-shaped PLLA (0% lysine), and different examples of the copolymer SS-PLLA-b-PLYS with different percentages of lysine (2% lysine and 5% lysine) were prepared. The copolymers SS-PLLA-b-PLYS with different percentages of lysine were prepared according to the reaction scheme shown in FIG. 7A. 2% (w/v) solutions of each of the polymers were prepared in tetrahydrofuran (THF). Each of the polymer solutions was used in a typical emulsification process (during which glycerol was gradually added to the polymer solution) and in a reverse emulsification process (during which the polymer solution was quickly added to glycerol). During glycerol or polymer solution addition, the mixtures were rigorously stirred at 50° C. After 5 minutes, each mixture was poured into liquid nitrogen to induce phase separation. The glycerol and the THF were extracted by washing with water, and various microspheres were formed. The microspheres were freeze-dried and examined using scanning electron microscopy (SEM) and confocal imaging.

FIGS. 10A through 10C illustrate the microspheres formed with SS-PLLA-b-PLYS having the lysine content of 5%. Under the typical emulsification process, SS-PLLA-b-PLYS with 5% PLYS forms NF-HMS (FIG. 10A). In contrast, under reverse emulsification, SS-PLLA-b-PLYS with 5% PLYS forms NF-SMS (FIG. 10B). The internal porous structure of the NF-SMS of FIG. 10B was confirmed by confocal imaging, as shown in FIG. 10C.

When PLYS was less than 5%, the SS-PLLA-b-PLYS copolymer (2% lysine) or SS-PLLA (0% lysine) could not stabilize multiple glycerol domains in one polymer solution droplet during reverse emulsification. Rather, one glycerol domain was stabilized in one polymer solution droplet, forming NF-HMS. The SEM of the NF-HMS formed with SS-PLLA-b-PLYS copolymer (2% lysine) and reverse emulsification is shown in FIG. 10E, and confocal imaging confirmed that the NF-HMS microspheres had one core inside (FIG. 10F). The SEM of the NF-HMS formed with SS-PLLA (0% lysine) and reverse emulsification is shown in FIG. 10H, and confocal imaging confirmed that the NF-HMS microspheres had one core inside (FIG. 10I). The same polymers also stabilized one glycerol domain in the typical emulsification process to form NF-HMS. The SEM of the NF-HMS formed with SS-PLLA-b-PLYS copolymer (2% lysine) and typical emulsification is shown in FIG. 10D, and the SEM of the NF-HMS formed with SS-PLLA (0% lysine) and typical emulsification is shown in FIG. 10G.

Linear PLLA does not contain any OH or other glycerolphilic groups, and thus cannot stabilize either multiple or single glycerol domains inside the polymer solution droplet. As such, linear PLLA results in the formation of non-hollow microspheres in both the typical emulsification process (FIG. 10J) and the reverse emulsification process (FIGS. 10K and 10L).

Example 2—PLLA-g-PHEMA

PLLA-g-PHEMA was made from L-lactide and (hydroxyethyl) methacrylate (HEMA). HEMA was used as an initiator for the ring-opening polymerization of L-lactide (LLA) to create a macromonomer. The macromonomer was then copolymerized with HEMA (serving as a monomer in this step) through free radical polymerization. 2% (w/v) solutions of PLLA-g-PHEMA were prepared in tetrahydrofuran (THF). Each of the polymer solutions was used in a typical emulsification process (during which glycerol was gradually added to the polymer solution) and in a reverse emulsification process (during which the polymer solution was quickly added to glycerol). During glycerol or polymer solution addition, the mixtures were rigorously stirred at 50° C. After 5 minutes, each mixture was poured into liquid nitrogen to induce phase separation. The glycerol and the THF were extracted by washing with water, and various microspheres were formed. The microspheres were freeze-dried and examined using scanning electron microscopy (SEM).

Figure 11A:
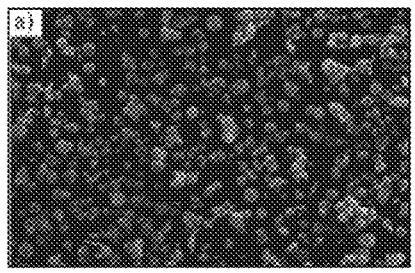
FIGS. 11A through 11D are SEM images of microspheres fabricated from poly((hydroxyethyl)methacrylate)-graft-poly(L-lactic acid) (PHEMA-g-PLLA) through reverse emulsification (FIGS. 11A and 11B) and through typical emulsification (FIGS. 11C and 11D)
Figure 11C:
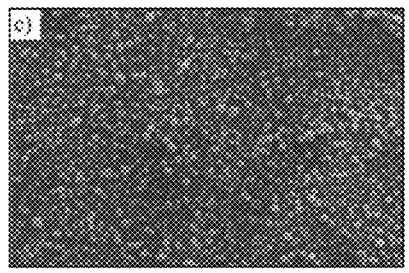
Figure 11B:
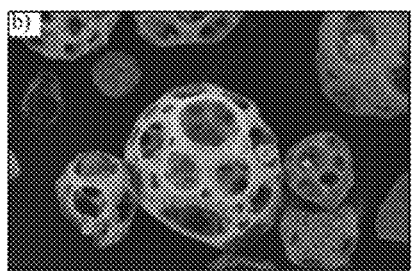
Figure 11D:
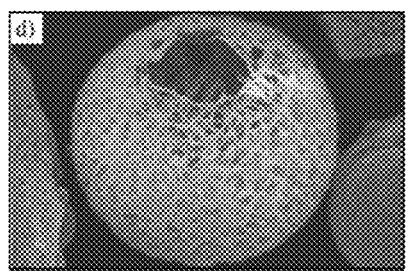

FIGS. 11A and 11B are the SEM images of the microspheres formed with PLLA-g-PHEMA and the reverse emulsification process. FIGS. 11C and 11D are the SEM images of the microspheres formed with PLLA-g-PHEMA and the typical emulsification process. As depicted, PLLA-g-PHEMA forms spongy microspheres (NF-SMS) using reverse emulsification, while the same polymer forms NF-HMS using typical emulsification.

Example 3—SS-PLLA

In order to prepare star-shaped PLLA (SS-PLLA) with a defined branch number, initiators with 2, 3, 4, 8, 16, 32 and 64 initiating sites (i.e., hydroxyl groups) were used to polymerize L-lactide to obtain 2-arm PLLA (i.e., linear PLLA), 3-arm PLLA, 4-arm PLLA, 8-arm PLLA, 16-arm PLLA, 32-arm PLLA, and 64-arm PLLA, respectively.

To obtain linear PLLA, ethylene glycol (2.7 mg, 4.34×$10^{-2}$ mmol), $Sn(Oct)_2$ (17.6 mg, 4.34×$10^{-2}$ mmol), and L-lactide (5 g, 34.7 mmol) were added to a dried glass ampule equipped with a magnetic stirring bar. After purging six times with dry nitrogen, the ampule was sealed under vacuum, and placed in an oil bath thermostated at 135° C. After 24 hours, the reaction mixture was dissolved in chloroform, and precipitated into an excess of methanol. After filtration, the above dissolution-precipitation cycle was repeated for three times. After drying in a vacuum oven overnight at room temperature, linear PLLA was obtained as a white solid (4.3 g, yield: 86.0%; $M_{n,GPC}$=61.7 kDa, $M_w/M_n$=1.38). According to similar procedures, the star-shaped PLLA were prepared using glycerol, pentaerythritol, N,N,N',N'-tetra(2,3-dihydroxypropyl)ethane-1,2-diamine, PAMAM dendrimers (G2-OH), (G3-OH), or (G4-OH) as the initiator, which were denoted as 3-arm PLLA, 4-arm PLLA, 8-arm PLLA, 16-arm PLLA, 32-arm PLLA, and 64-arm PLLA, respectively. The ring-opening polymerization of L-lactide was conducted under anhydrous conditions to minimize side reactions. The average length of each arm of the star-shaped polymers could be tailored by adjusting the initiator/monomer ratio. In this example, the synthesized star-shaped polymers are abbreviated as X-arm PLLA-Y, where, as previously described, X stands for the number of hydroxyls of the initiator that was used, and Y indicates the feeding ratio of the monomer to the hydroxyls on the initiator. The characterization of some of the star-shaped polymers that were synthesized is summarized in Table 1 provided herein.

Microspheres were then fabricated from the linear PLLA and some examples of the star-shaped PLLA via a typical emulsification and thermally induced phase separation technique. The SS-PLLA was dissolved in THF at the concentration of 2% w/v, and then glycerol was added gradually to emulsify the SS-PLLA solution into liquid microspheres via rigorous stirring at 50° C. The mixture was poured into liquid nitrogen to induce phase separation. After glycerol and solvent extraction with distilled ice water, the microspheres were freeze-dried and stored in vacuum. In this example, all of the microspheres were fabricated under the same conditions (concentrations, stirring speed, and temperature).

The characterization of some of the microspheres synthesized in this example is summarized in Table 3.

TABLE 3

Characterization of the Microspheres Fabricated from Linear and Star-Shaped PLLA with Varying Arm Numbers

| microspheres | surface area ($m^2/g$) | porosity (%) | overall density ($g/cm^3$) | fiber diameter (nm) | fiber length (nm) |
|---|---|---|---|---|---|
| 2-arm PLLA-150 | 1.3 ± 0.2 | 10.1 | 1.071 | / | / |
| 2-arm PLLA-400 | 110.4 ± 1.0 | 90.1 | 0.127 | 169 ± 77 | 2309 ± 541 |
| 3-arm PLLA-150 | 1.9 ± 0.5 | 16.7 | 1.020 | / | / |
| 3-arm PLLA-300 | 109.7 ± 0.9 | 88.3 | 0.150 | 172 ± 48 | 1920 ± 433 |
| 4-arm PLLA-50 | 4.3 ± 1.1 | 25.1 | 0.966 | / | / |
| 4-arm PLLA-100 | 120.4 ± 0.8 | 94.8 | 0.067 | 151 ± 40 | 1715 ± 409 |

TABLE 3-continued

Characterization of the Microspheres Fabricated from
Linear and Star-Shaped PLLA with Varying Arm Numbers

| microspheres | surface area (m²/g) | porosity (%) | overall density (g/cm³) | fiber diameter (nm) | fiber length (nm) |
|---|---|---|---|---|---|
| 4-arm PLLA-300 | 112.3 ± 1.4 | 91.9 | 0.104 | 171 ± 91 | 2080 ± 559 |
| 4-arm PLLA-400 | 121.1 ± 2.5 | 89.1 | 0.139 | 163 ± 89 | 1960 ± 617 |
| 8-arm PLLA-300 | 118.4 ± 1.1 | 95.6 | 0.057 | 149 ± 75 | 2210 ± 328 |
| 16-arm PLLA-50 | 89.5 ± 1.7 | 69.3 | 0.396 | / | / |
| 16-arm PLLA-100 | 120.8 ± 1.3 | 95.2 | 0.062 | 143 ± 60 | 1520 ± 355 |
| 16-arm PLLA-200 | 121.7 ± 2.0 | 95.7 | 0.059 | 151 ± 44 | 1630 ± 391 |
| 16-arm PLLA-500 | 118.8 ± 1.6 | 94.1 | 0.075 | 156 ± 63 | 1480 ± 719 |
| 16-arm PLLA-700 | 124.0 ± 1.3 | 92.0 | 0.103 | 156 ± 63 | 1480 ± 719 |
| 32-arm PLLA-100 | 119.2 ± 1.9 | 94.8 | 0.067 | 146 ± 67 | 1983 ± 354 |
| 32-arm PLLA-600 | 120.8 ± 1.3 | 95.6 | 0.056 | 143 ± 59 | 2110 ± 369 |
| 32-arm PLLA-700 | 124.2 ± 2.7 | 90.3 | 0.124 | 139 ± 72 | 1847 ± 573 |
| 64-arm PLLA-100 | 111.8 ± 2.3 | 90.7 | 0.123 | 142 ± 59 | 1285 ± 597 |
| 64-arm PLLA-200 | 117.2 ± 2.1 | 94.4 | 0.072 | 175 ± 77 | 1420 ± 714 |
| 64-arm PLLA-400 | 120.7 ± 1.5 | 95.2 | 0.062 | 156 ± 81 | 1876 ± 469 |
| 64-arm PLLA-600 | 118.1 ± 1.7 | 96 | 0.051 | 161 ± 67 | 1756 ± 815 |
| 64-arm PLLA-700 | 115.6 ± 1.9 | 91.4 | 0.110 | 142 ± 61 | 2138 ± 396 |

Nano-Scale Self-Assembly

Figure 12A:
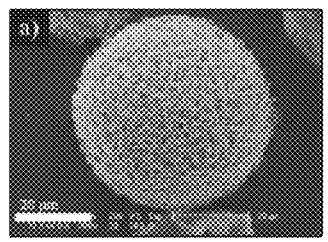
FIGS. 12A through 12F are SEM images of microspheres fabricated from 2-arm PLLA-400 (FIGS. 12A and 12B), 2-arm PLLA-200 (FIGS. 12C and 12D), and 2-arm PLLA-100 (FIGS. 12E and 12F)
Figure 12C:
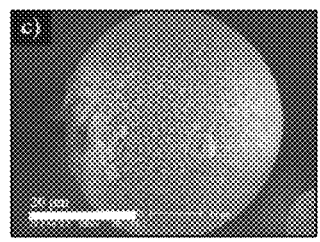
Figure 12E:
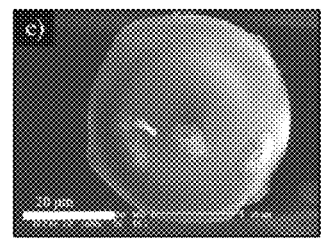
Figure 12B:
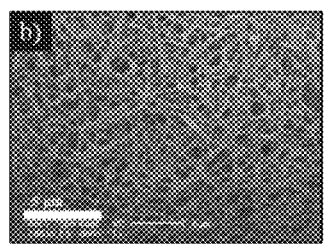
Figure 12D:
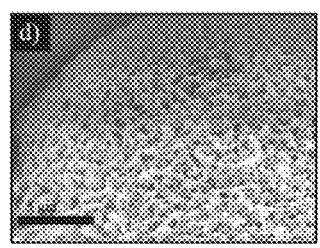
Figure 12F:
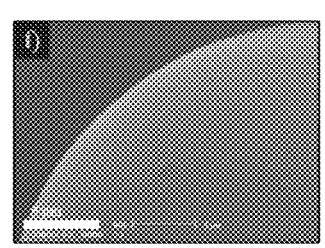

A linear PLLA/tetrahydrofuran (THF) solution self-assembles into nanofibers when the MW of the polymer is larger than about 50 kDa. If linear PLLA has a lower MW, the nanofibrous structure will transform into a solid smooth structure under the same conditions. As depicted in FIGS. 12A through 12E, the phase separation behavior of 2-arm PLLA (i.e., linear PLLA) changed from forming nanofibers (FIGS. 12A and 12B), to an aggregated fibrous structure (FIGS. 12C and 12D), to a smooth solid structure (FIGS. 12E and 12F) when the MW was decreased.

To determine whether a MW threshold existed for each SS-PLLA to trigger nano-scale phase separation, SS-PLLA with different arm numbers and MW were synthesized as described above and shown in Table 3. For 3-arm, 4-arm, 8-arm, 16-arm, 32-arm and 64-arm SS-PLLAs, there existed MW thresholds for nanofiber formation, which were around 40 kDa, 20 kDa, 30 kDa, 60 kDa, 100 kDa and 200 kDa, respectively. It was found that the arm length of SS-PLLA having different arm numbers that could self-assembly into nanofibers needs to be or exceed a similar value (Y≥100) in order to enable phase separation into nanofibers. For example, each of the following SS-PLLAs self-assembled into a nanofibrous structure: 3-arm PLLA-300, 4-arm PLLA-100, 8-arm PLLA-300, 16-arm PLLA-100, 32-arm PLLA-100, and 64-arm PLLA-100.

The selected polymer/solvent system, PLLA and THF, went through the liquid-liquid phase separation because the solvent crystallization temperature is lower than the phase separation temperature. Under the polymer concentrations and temperature used in this example, phase separation followed a spinodal decomposition pathway, leading to the bicontinuous pattern formation consisting of nano-sized polymer-rich and polymer-lean phases. The PLLA molecular chains are believed to play a critical role in phase separation, which probably coagulate with each other to form a continuous nanofibrous phase pattern. Therefore, long molecular chains may be needed to allow efficient coagulation to form a continuous nanofibrous pattern. As such, the arm length, instead of the total MW of the star-shaped polymers, may need to be at or greater than a certain value (Y≥100) for nanofiber formation. The need for long molecular chains may also be attributed to the crystallinity of the polymers. PLLA, a semicrystalline polymer, can crystalize to stabilize the phase separation pattern until solvent extraction. The crystallinity of SS-PLLA is much lower than that of their linear counterpart with comparable MW, and the increase in the arm length will increase the crystallinity of SS-PLLA. Therefore, long polymer arms are needed to provide sufficient crystallinity for stabilization of the bicontinuous nano-sized pattern towards nanofiber formation.

Micro-Scale Self-Assembly

To investigate how the molecular structure of SS-PLLA affects the micro-scale assembly of hollow structure within the microspheres, the arm numbers and arm length of SS-PLLA were varied for the typical emulsification/phase separation processes. The structure transformation of formed microspheres was observed via SEM imaging.

Arm Number:

SS-PLLAs having different arm numbers were fabricated into microspheres for comparison. The arm lengths of the SS-PLLAs were kept the same to decouple their effects on self-assembly of the microspheres, with Y=100 to also allow nanofiber formation in all groups. Therefore, 3-arm PLLA-100, 4-arm PLLA-100, 8-arm PLLA-100, 16-arm PLLA-100, 32-arm PLLA-100 and 64-arm PLLA-100 were utilized. 2-arm PLLA-200 instead of 2-arm PLLA-100 was used form comparison since 2-arm PLLA-100 did not form a nanofibrous structure (see FIGS. 12E and 12F).

Figure 13P:
FIGS. 13A through 13U are SEM images of microspheres fabricated from 2-arm PLLA-200 (FIGS. 13A-13C), 3-arm PLLA-100 (FIGS. 13D-13F), 4-arm PLLA-100 (FIGS. 13G-13I), 8-arm PLLA-100 (FIGS. 13J-13L), 16-arm PLLA-100 (FIGS. 13M-13O), 32-arm PLLA-100 (FIGS. 13P-13R), and 64-arm PLLA-100 (FIGS. 13S-13U)
Figure 13Q:
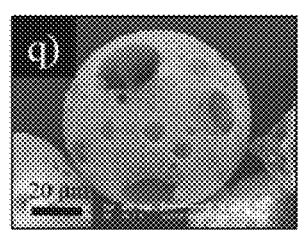
Figure 13R:
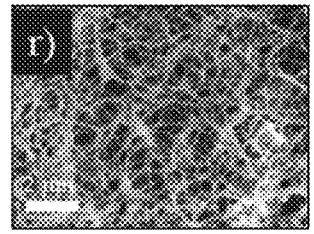
Figure 13S:
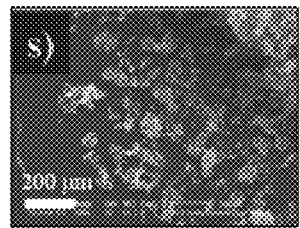
Figure 13T:
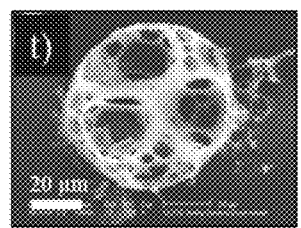
Figure 13U:
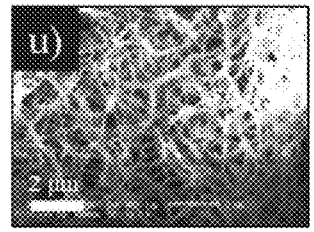

The morphologies of the obtained microspheres were shown in FIGS. 13A through 13U. All of the microspheres were all composed of nanofibers, as confirmed by SEM (FIGS. 13F, 13I, 13L, 13P, 13O, 13R, and 13U), and by the high surface areas (>110 m²/g) and porosities (>90%). The average fiber lengths of the microspheres all ranges from 1.5 μm to 2.5 μm (see Table 3).

As shown in FIGS. 13A through 13C, the nanofibrous microspheres prepared from 2-arm PLLA-200 did not consist of an open hollow structure.

When the arm numbers (Y) of the star-shaped polymers were higher than two and smaller than 32, hollow microspheres with one or more open pores on the shells were generated (see FIGS. 13D and 13E, 13G and 13H, 13J and 13K, and 13M and 13N). The diameter of these microspheres ranged from 30 μm to 60 μm, and the average diameter of the openings was estimated to be 10 μm. The nanofibrous microspheres fabricated from 3-arm PLLA-100, 4-arm PLLA-100, and 8-arm PLLA-100 usually contained one open pore on the surface. Most of the nano-fibrous microspheres made from 16-arm PLLA-100 also contained one open pore, but some of them contained multiple pores (≥2).

Figure 14A:
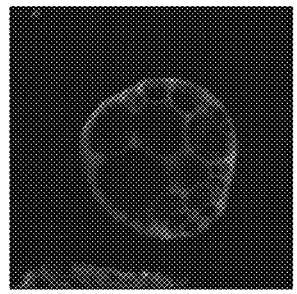
FIGS. 14A and 14B are confocal images of nanofibrous spongy microspheres fabricated from 32-arm PLLA-100 (FIG. 14A) and 64-arm PLLA-100 (FIG. 14B)
Figure 14B:
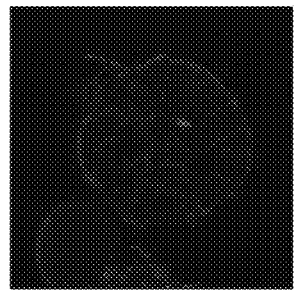

As shown in FIGS. 13P through 13U, the nanofibrous microspheres fabricated from 32-arm PLLA-100 and 64-arm PLLA-100 had a porous structure. The diameter of these nanofibrous porous/spongy microspheres (NF-SMS) ranged from 30 µm to 60 µm, and the average pore size was also estimated to be 10 µm. The internal structure of the porous nanofibrous microspheres was observed using confocal imaging. These images are shown in FIGS. 14A and 14B (scale bar is 10 µm for these figures). As illustrated in FIGS. 14A and 14B, the porous microspheres had an interconnected porous network at the micro-scale. The microspheres fabricated from 64-arm PLLA-100 (FIG. 14B) seemed to have more pores per sphere compared to spheres fabricated from 32-arm PLLA-100 (FIG. 14A).

The densities of the NF-HMS and NF-SMS were about ½ the density of the NF-MS fabricated from 2-arm PLLA-400. It is believed that this is due to the nanofibrous and hollow and the nanofibrous and spongy structure, respectively, of the NF-HMS and NF-SMS.

Arm Length:

The arm length of the star-shaped polymers was adjusted to determine the effect that the arm length had on the structures of the formed microspheres at the micro-scale. By adjusting the feeding ratio of monomer to initiator, SS-PLLA was fabricated to have different average arm lengths. The following results are for the 4-arm and 16-arm SS-PLLAs, but the phenomenon observed with these SS-PLLAs was also seen in other star-shaped polymer systems.

For the 4-arm SS-PLLA, the structure of the formed microspheres transitioned from NF-HMS to NF-MS as the arm length increased (see FIGS. 15A through 15D). When the arm length was very short (Y=50), hollow microspheres with a smooth surface, instead of a nanofibrous surface, were formed (FIG. 15A). This was attributed to the nanoscale phase separation process, i.e., when the arm length was short, SS-PLLA had an insufficient MW for nano-scale phase separation into nanofibers, and instead formed a smooth surface. When the arm length increased, nanofibrous microspheres were formed. A similar phenomenon was seen in 2-arm PLLAs (FIGS. 12A through 12F), where the decrease in arm length resulted in non-nanofibrous structures without altering the microstructures. These findings indicated that the phase separation at the nano-scale did not interfere with the structure formation at the micro-scale. Therefore, the star-shaped polymers can be altered at the molecular level to control their self-assembly at the nano- and micro-scale levels independently.

To more clearly demonstrate how the arm length transitioned the structure of the microspheres at the micro-scale, confocal imaging was used to observe the 3D structure of the spheres fabricated from 4-arm PLLA-300, 4-arm PLLA-400 and 4-arm PLLA-500. While these results are not shown, microspheres made from 4-arm PLLA-500 had a non-hollow interior structure, some microspheres made from 4-arm PLLA-400 had a hollow interior structure although no open pores were seen on the outer surface of the microspheres, and most microspheres made from 4-arm PLLA-300 had hollow microspheres with open holes on the shells. These results were consistent with the SEM results shown in FIGS. 15B through 15D. A decrease in the arm length (Y) seems to favor the hollow formation, with Y=300 being the threshold value for 4-arm PLLA.

Similarly, for the 16-arm PLLA, the formed microspheres transitioned from non-hollow microspheres to hollow microspheres as the arm length decreased (see FIGS. 16A through 16H). Different from 4-arm PLLAs, the threshold for hollow formation for 16-arm PLLAs was Y=700, meaning that 16-arm PLLA allowed longer arm length for hollow structure generation. As shown in FIGS. 16A and 16B, a further decrease of arm length could lead to porous microspheres formation, similar to microspheres fabricated from 32-arm PLLA-100 and 64-arm PLLA-100 (FIGS. 13P through 13U), except that the 16-arm PLLA microspheres had an aggregated fibrous structure at the nano-scale due to the short arm length (Y=50<100). This structure transition (from NF-MS (FIGS. 16G and 16H) to NF-HMS (FIGS. 16E and 16F) to SMS (FIGS. 16A through 16D)) was also seen in 32-arm and 64-arm star-shaped polymer systems (data not shown).

Hydroxyl Groups:

As shown herein, the increase in number of arms (X) at a fixed arm length (Y) and the decrease in arm length (Y) at fixed arm numbers (X) favored the formation of hollow microspheres. Both the increase in number of arms (X) at a fixed arm length (Y) and the decrease in arm length (Y) at fixed arm numbers (X) are associated with an increase in hydroxyl density of SS-PLLA. The hydroxyl density of SS-PLLA using the molar ratio of hydroxyls (on the polymer) to monomer L-lactide is denoted in this example as OH/LLA (i.e., [OH]/[M]). The hydroxyl groups on the end of each arm as well as the hydroxyls on the core of the polymer (i.e., the unreactive sites of the initiators due to steric hindrance during polymerization) were both considered. Thus, OH/LLA was not affected by the steric hindrance during polymerization, but was solely determined by the feeding ratio of monomer to initiator during synthesis (therefore OH/LLA=1/Y).

Two experiments were performed to determine whether the hydroxyl groups determined the hollow structure formation instead of the arm numbers or length and whether SS-PLLA with a high OH/LLA would favor the formation of hollow/porous structure.

In the first experiment, click chemistry was used to cap the hydroxyls on the star-shaped polymers. Isopropyl isocyanate was reacted with the hydroxyls on each end of the 16-arm SS-PLLA as well as the core unreacted hydroxyls to form 16-arm SS-PLLA-isopropyl. The hydroxyl-capping reaction turned off the polymer's capability to self-assemble into hollow microspheres, as the microsphere that was formed was solid. Similar results were seen in other SS-PLLAs with different numbers of arms (4-arm, 8-arm, 32-arm and 64-arm, data not shown). These results indicate that the hydroxyl groups on SS-PLLA are required and responsible for the hollow structure formation within the microspheres. At the nano-scale, however, the absence of hydroxyls did not affect the nanofiber formation, which supports that the nano-scale phase separation is mainly a result of polymer chain-chain interaction.

In the second experiment, the hydroxyl density of the star-shaped polymers was increased without changing the arm length (Y) or number (X). The hydroxyl groups on the polymer were first converted into vinyl groups, which were later reacted with 1-thioglycerol through a thiol-ene click reaction. After the modification, the hydroxyl density (OH/LLA) was doubled.

Figure 17A:
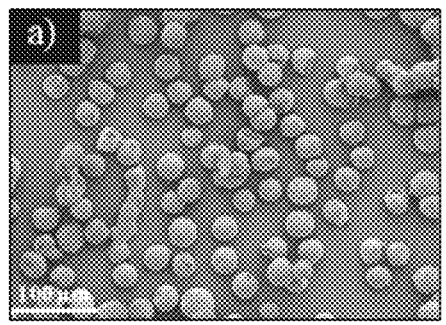
FIGS. 17A through 17H are SEM images of the microspheres fabricated from 4-arm PLLA-400 (FIGS. 17A and 17B), 4-arm PLLA-400-diol (FIGS. 17C and 17D), 16-arm PLLA-100 (FIGS. 17E and 17F), and 16-arm PLLA-100-diol (FIGS. 17G and 17H)
Figure 17B:
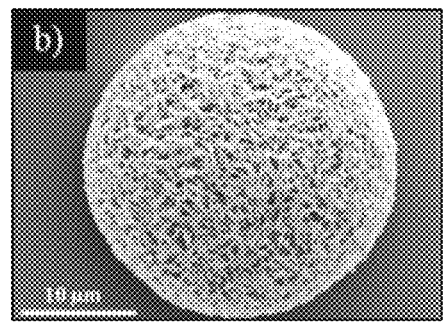
Figure 17C:
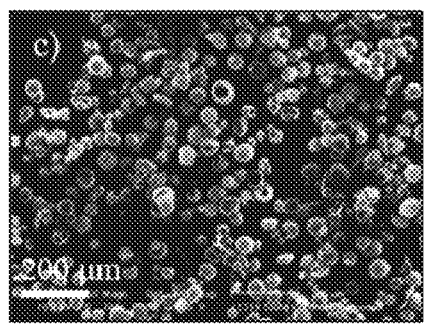
Figure 17D:
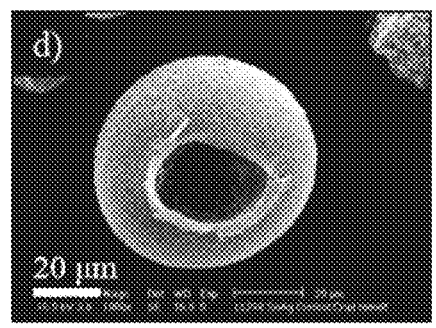

4-arm PLLA-400, which had a low original OH/LLA value (=1/400) and formed NF-MS (FIGS. 17A and 17B), was chosen for modification. After the "hydroxyl doubling" reaction, 4-arm PLLA-400-diol (increased OH/LLA=~1/200) could form NF-HMS (FIGS. 17C and 17D), which was similar to the NF-HMS fabricated from 4-arm PLLA-200

Figure 17E:
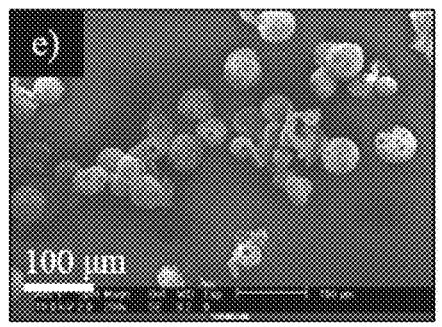
Figure 17F:
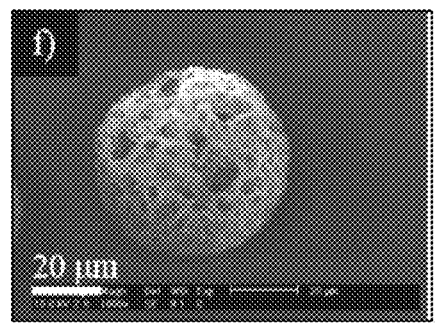
Figure 17G:
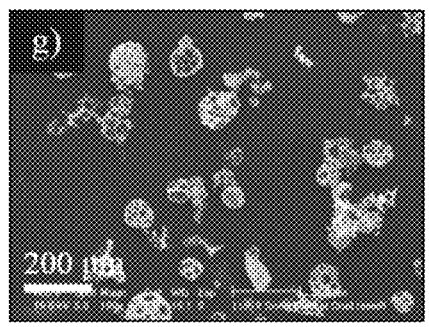
Figure 17H:
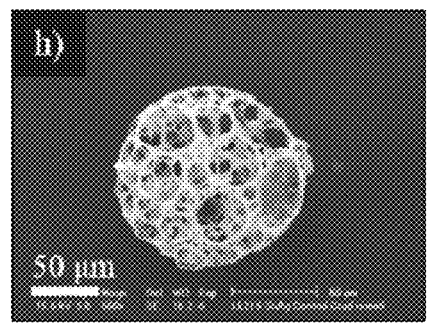

(having an original OH/LLA=1/200, data not shown). 16-arm PLLA-100 (original OH/LLA=1/100), which formed NF-HMS (FIGS. 17E and 17F), was also investigated. After the doubling reaction, the increased hydroxyl density of 16-arm PLLA-100 was 1/50. This 16-arm PLLA-100-diol formed porous/spongy microspheres (FIGS. 17G and 17H), similar to those made from 16-arm PLLA-50 (OH/LLA=1/50, FIGS. 16 A and 16B). In these microspheres, nanofibers were not formed due to the arm length being shorter than 100.

The same phenomenon with the hydroxyl doubling was also observed in other star-shaped polymer systems, but this data is not shown. Thus, SS-PLLA with a high OH/LLA favors the hollow structure formation within the microspheres. Additionally, SS-PLLA with the same OH/LLA value and arm number but different arm length could form microspheres with similar micro-structures.

It is believed that the formation of the hollow(s) within the microspheres and the open pores on the surface was attributed to micro-scale self-assembly of the star-shaped polymers during the emulsification process. During emulsification, a large amount of glycerol (more than three times the volume of the polymer solution) was gradually added into the rigorously stirred polymer solution. Initially, glycerol was the dispersed phase in the polymer solution. The addition of excessive glycerol induced phase inversion, creating a complex, micro-scale phase pattern, with glycerol as the new continuous phase. Due to the phase inversion, the initial dispersed phase of glycerol micro-droplets was encapsulated within the polymer solution phases (which were the new dispersed phase), creating an unstable phase pattern containing high interfacial areas and free energy. Therefore, this unstable phase pattern tended to re-organize and transformed to a more stabilized phase pattern. Upon quenching the emulsion in liquid nitrogen and the subsequent extraction of the solvent and glycerol, the microspheres were obtained. The polymer chains were also going through a nano-scale phase separation to further lower system energy, which was induced by adding the emulsion into liquid nitrogen post to the micro-scale phase separation. Therefore, the phase separation at nano- and micro-scales occurred in a sequence, which explains why they did not interfere with one another.

As shown in FIGS. 13A and 13B, nanofibrous microspheres without a hollow core were obtained using the 2-arm PLLA-200. Thus, emulsions prepared from 2-arm PLLA-200 transitioned into single emulsions, i.e., the glycerol micro-domains within the polymer solution phase entered into the continuous phase (glycerol), to decrease interfacial areas and lower system energy. After extraction of the solvent and glycerol, polymeric microspheres without a hollow core were obtained. 16-arm SS-PLLA, however, was able to form hollow microspheres (see FIGS. 13M through 13O). This indicated that the final stabilized phase pattern of the emulsions was different from that of the emulsion prepared from linear PLLA (i.e., 2-arm PPLA). Glycerol micro-domains were able to be stabilized within the polymer solution phase of 16-arm PLLA, leading to the formation of a phase pattern containing a large amount of interfacial areas and the generation of hollow structure within the formed microspheres.

When the number of arms was fixed, there existed an OH/LLA threshold value, denoted herein as OH/LLA*, which represents the transition point for hollow microsphere formation from SS-PLLAs. OH/LLA* for SS-PLLA with different arm numbers is summarized in Table 4.

TABLE 4

OH/LLA* values for Linear and Star-Shaped PLLA with Varying Arm Numbers

| Arm Number | OH/LLA* |
|---|---|
| 2 | 1/80[a] |
| 3 | 1/200 |
| 4 | 1/300 |
| 8 | 1/300 |
| 16 | 1/700 |
| 32 | 1/700 |
| 64 | 1/700 |

[a]OH/LLA* was determined from linear PLLA with two OH groups at each end of the polymer chain.

If the star-shaped polymer had an original or increased OH/LLA value greater than OH/LLA*, it could self-assemble into at least hollow microspheres under the developed emulsification conditions.

Based on the previous discussion, OH/LLA determines, at least in part, the hollow structure formation, with increased OH/LLA favoring the formation of hollow or even spongy/porous structure within the microspheres. It is believed that SS-PLLA with a high hydroxyl density could serve as a surfactant to assemble at the interface between different phases and provide the necessary stabilizing force. This was proven by the structural transition from hollow to non-hollow microspheres with 4-arm PLLA-100 when the hydroxyls were capped (data not shown). In addition, increased OH/LLA alone could lead to the structural transition from non-hollow to hollow core formation when the arm length and arm number were unchanged (see FIGS. 17A through 17H). Therefore, sufficient hydroxyl groups were needed to assemble at the interfaces between the different phases to stabilize the phase pattern and form hollow microspheres. When the OH/LLA was high enough, porous/spongy microspheres were formed (seen in 16, 32 and 64 arm PLLAs). SS-PLLAs with higher hydroxyl density could assemble into a phase pattern containing more interface areas between polymer and glycerol phases.

It was found that the OH/LLA* value decreased as the number of arms increased, which ultimately stabilized at around 1/700. This suggested that increased number of arms favored the hollow microspheres formation. However, when the number of arms was greater than 16, OH/LLA* remained unchanged. This phenomenon could be attributed to the conformational difference between star-shaped polymers with different arm numbers. Linear polymers have a more random chain conformation and folded structure, which might easily bury the hydroxyl end groups. Star-shaped polymers, on the other hand, have a less random chain conformation because the polymer chains are linked to a core. With an increasing number of arms, the polymer chains are more constrained and less folded, transitioning into a more spherical conformation. Therefore, hydroxyls on the end of each arm are more easily exposed to the oil-water interface for stabilization. As a result, the OH/LLA* (the minimum hydroxyls needed to stabilize double emulsions) decreases as the arm number increases. When the arm number increases to a certain degree (e.g., 16 in this example), the star-shaped polymers all assume a spherical conformation, thus having a similar OH/LLA*.

The OH/LLA threshold for spongy microsphere formation using typical emulsification for the 16-arm, 32-arm and 64-arm PLLAs is 1/100, 1/150 and 1/150, respectively. In light of the data provided herein, the microsphere structure may be determined, as a function of arm numbers and hydroxyl density when typical emulsification is used. The transition from one structure to the next, based on the above mentioned data, is plotted in FIG. 8 as a function of X and 1/Y (OH/LLA). FIG. 8 may be used to configure the parameters of the SS-PLLA to control the structure of the formed microspheres at both the nano- and micro-scales.

Example 4

Figure 18A:
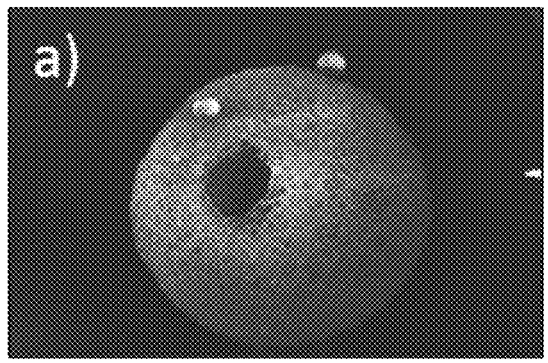
FIGS. 18A through 18F are SEM images and confocal images of nanofibrous hollow microspheres (NF-HMS) with different diameters, where the NF-HMS having its diameter between 30 μm and 60 μm is shown in FIGS. 18A and 18B, the NF-HMS having its diameter between 60 μm and 90 μm is shown in FIGS. 18C and 18D, and the NF-HMS having its diameter between 90 μm and 180 μm is shown in FIGS. 18E and 18F.
Figure 18B:
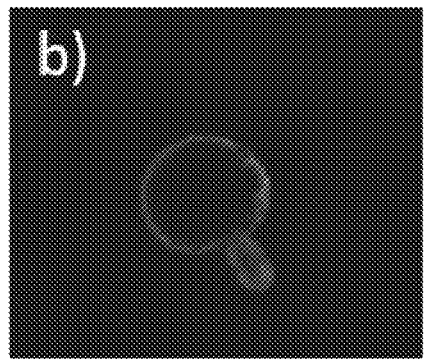
Figure 18C:
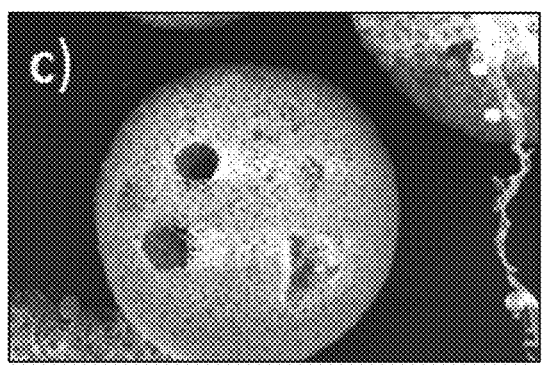
Figure 18D:
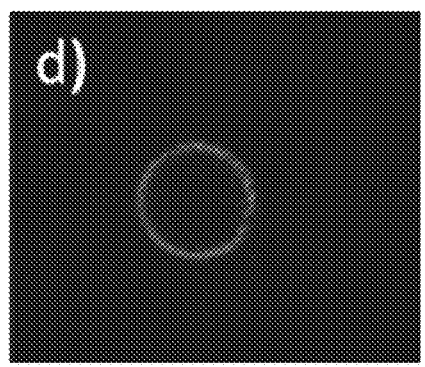
Figure 18E:
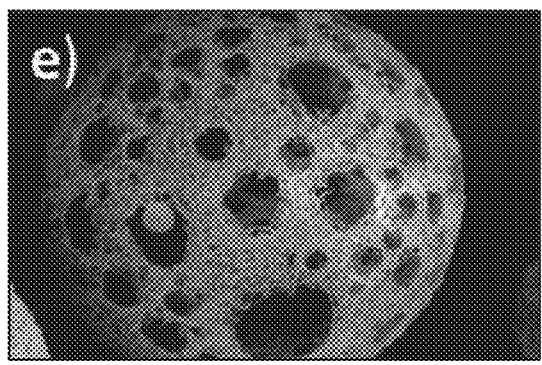
Figure 18F:
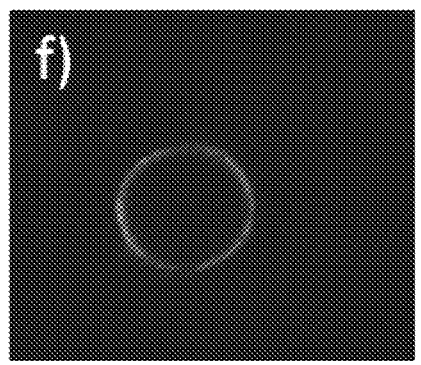
Figure 19B:
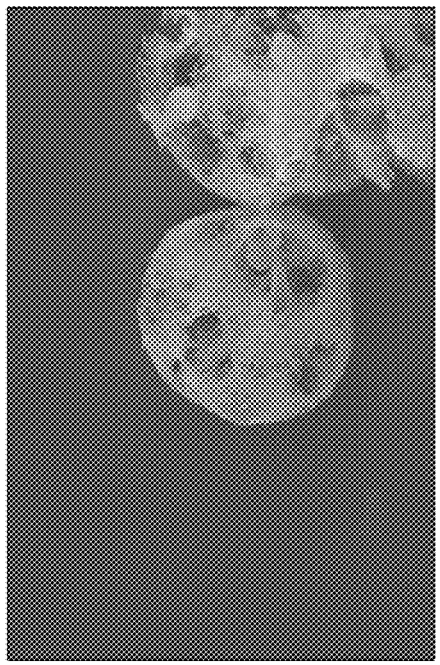
FIGS. 19A through 19D are SEM images of dental pulp stem cells (DPSC) seeded onto solid microspheres (FIGS. 19A and 19C) and on nanofibrous spongy microspheres (FIGS. 19B and 19D)
Figure 19D:
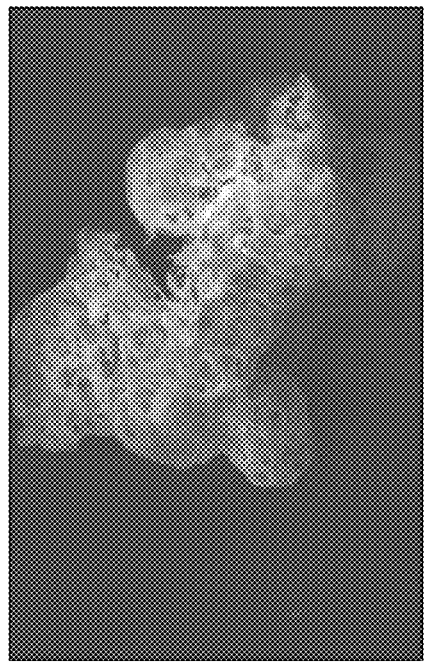
Figure 19A:
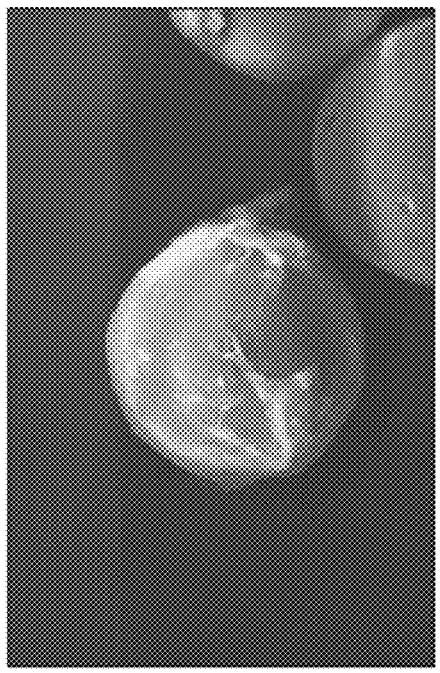
Figure 19C:
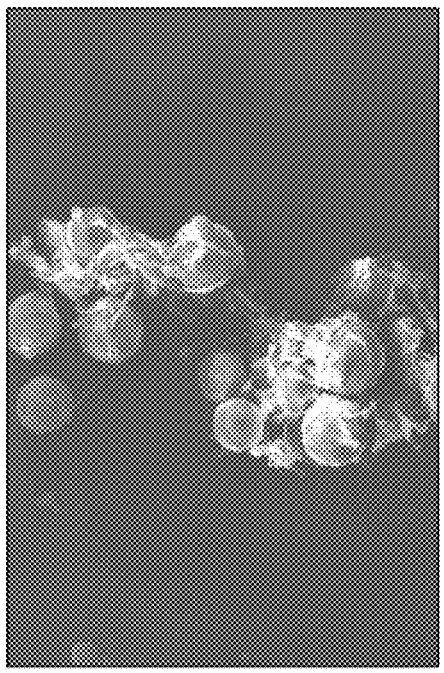

16-arm PLLA-200 was fabricated according to a similar procedure described in example 3. 16-arm PLLA-200 was used to fabricate nanofibrous hollow microspheres (NF-HMS) with different diameters. Structural characterization of the nanofibrous hollow microspheres (NF-HMS) was performed to illustrate that while the exterior of the NF-HMS may be similar to the NF-SMS (e.g., each may have multiple openings at the exterior of the microsphere), unlike the NF-SMS, the NF-HMS has a single hollow core. FIG. 18A is a SEM image of the NF-HMS with a diameter of 30 μm to 60 μm, and having one open hole on the front side of the microsphere shell. FIG. 18B is a confocal image of the NF-HMS of FIG. 18A. This confocal image shows the hollow interior structure. FIG. 18C is a SEM image of NF-HMS with a diameter of 60 μm to 90 μm. It is noted that this NF-HMS has three open holes on the front side of the microsphere shell. The confocal image of this NF-HMS shows its hollow interior structure (see FIG. 18D). FIG. 18E is the SEM image of NF-HMS with a diameter of 90 μm to 180 μm, and having multiple holes on the microsphere shell. Again, as shown in FIG. 18F, the confocal image of the NF-HMS with a diameter of 90 μm to 180 μm indicates its hollow interior structure. The NF-HMS are unlike any of the NF-SMS disclosed herein (e.g., see FIGS. 13P through 13U), which includes micro-scale pores formed throughout its interior.

Example 5

The odontogenic differentiation of human dental pulp stem cells (DPSCs) on solid microspheres (S-MS, without nanofibers or a hollow structure) and nanofibrous spongy microspheres (NF-SMS 10) were evaluated in vitro and in vivo.

The solid microspheres (S-MS) were fabricated using a conventional emulsification/solvent evaporation method. The nanofibrous spongy microspheres (NF-SMS 10) were fabricated from SS-PLLA-b-PLYS with a LYS/LLA ratio of 5% through the reverse emulsification method disclosed herein.

Dental pulp tissues were harvested from extracted healthy human third molars (patients were 16-20 years old). Human dental pulp stem cells (DPSCs) were isolated from the molars. The DPSCs were cultured in α-modified essential medium (α-MEM) (Invitrogen, Carlsbad, Calif.) supplemented with 10% fetal bovine serum (FBS) (Invitrogen) and 1% Pen Strep (Invitrogen) in a humidified incubator at 37° C. with 5% $CO_2$. The medium was changed every two days.

The S-MS and NF-SMS microspheres were soaked in 70% ethanol to pre-wet for 30 minutes and then were exchanged with phosphate-buffered saline (PBS) three times (30 minutes each). The microspheres were then washed with α-MEM containing 10% FBS for 30 minutes. Cells and microspheres were mixed in 2 ml medium in 15 ml centrifuge tube on orbital shaker for 4 hours, and then the mixture was transferred into bioreactor culture system (Wheaton industries Inc., Millville, N.J.).

For the odontogenic differentiation assay, the normal culture medium (i.e., α-modified essential medium) was changed into an odontogenic induced medium after 24 hours of seeding, which contained α-MEM supplemented with 10% FBS, 50 μg/ml ascorbic acid, 5 mM β-glycerophosphate and $10^{-7}$ M dexamethasone (DXM). The medium was changed every two days.

In Vitro

SEM Observation

After 24 hours of seeding, DPSCs cultured on S-MS and NF-SMS were rinsed in PBS once, fixed in 2.5% glutaraldehyde, and post-fixed in 1% osmiumtetroxide for 1 hour. Samples were dehydrated in a series of ethanol of increasing concentrations, and then in hexamethyldisilizane. The samples were then sputter-coated with gold using a sputter coater (SPI-MODULE, West Chester, Pa.) and observed under a scanning electron microscope (Philips XL30 FEG, Amsterdam, Holland) at 10 kV.

The SEM observation of some of the seeded microspheres confirmed that the DPSCs attached to both S-MS and NF-SMS, as shown in FIGS. 19A through 19D. On the NF-SMS, the cells attached not only to the outer surface, but also to the interior areas (FIGS. 19B and 19D), with abundant cellular processes (observed by confocal imaging, results not shown). On S-MS, the DPSCs only attached to the outer surface (FIGS. 19A and 19C), with a highly spread phenotype and limited cellular processes (observed by confocal imaging, results not shown).

DNA Quantification Assay

For a DNA quantification assay, the cell-spheres complexes were homogenized in 1×DNA assay buffer in lysis buffer (Sigma Aldrich) with a same volume, and were then incubated at 37° C. for 1 hour. Cell lysis was centrifuged at 5,000 g at room temperature for 3 minutes. The supernatant was collected for DNA content determination using fluorescence assay with Hoechst 33258 dye (Sigma Aldrich) on a microplate reader (Thermo Fisher Scientific Inc., Wyman Street Waltham, Mass.).

Figure 20:
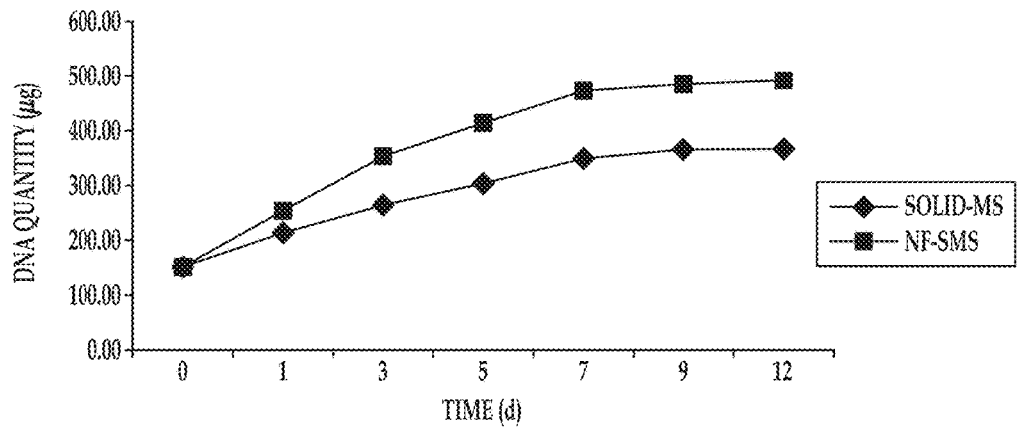
FIG. 20 is a graph illustrating the proliferation of DPSC on solid microspheres and nanofibrous spongy microspheres (NF-SMS)

The cell proliferation was measured by the DNA content. The DNA quantity assay revealed that DPSCs proliferated faster on NF-SMS than on S-MS during the first 12 days in vitro. These results are shown in FIG. 20. Based on these results, the NF-SMS provided a better microenvironment than S-MS for DPSCs to attach and proliferate.

Alkaline Phosphatase (ALP) Level Content Quantification

ALP (which is an early marker for osteogenic differentiation) content was detected using a SensoLyte™ pNPP Alkaline Phosphatase Assay Kit (AnaSpec, Campus Drive Fremont, Calif.). The ALP content was detected for the microspheres cultured in the normal culture medium (results shown as Solid-MS and NF-SMS in FIG. 21) and for those cultured the odontogenic induced medium described above (results shown as Solid-MS-Induced and NF-SMS-induced in FIG. 21).

Cells on the microspheres were homogenized in 300 μl lysis buffer on ice for 10 minutes. Lyses were centrifuged at 2500 g and 4° C. for 10 minutes. Supernatant was then collected for ALP assay using p-nitrophenyl phosphate as a phosphatase substrate and alkaline phosphatase supplied by the kit as a standard. The absorbance was measured at 405 nm on a microplate reader (Thermo Fisher Scientific Inc.). The amount of ALP in the cells was normalized against total protein content.

Figure 21:
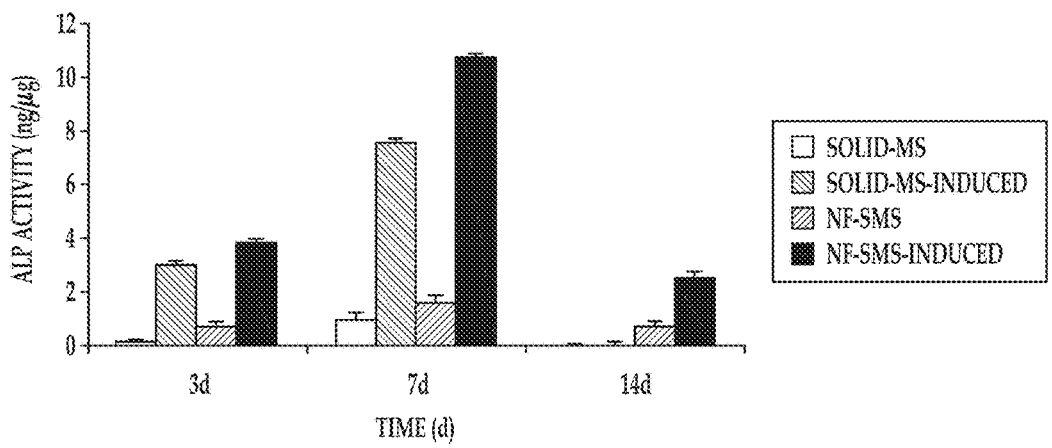
FIG. 21 is a graph illustrating the alkaline phosphatase activity (ALP) activity of DPSC cultured on solid microspheres and nanofibrous spongy microspheres (NF-SMS), the bars represent means±SD (n=3), * and ** represent statistically significant differences where *P<0.05; **P<0.01.

The results are shown in FIG. 21. As depicted, the ALP level peaked at day 7 for the induced S-MS and the induced NF-SMS. The ALP level in DPSCs seeded on the NF-SMS was significantly higher than the ALP level in the S-MS group at days 3, 7 and 14.

Odontogenic Differentiation

Figure 22:
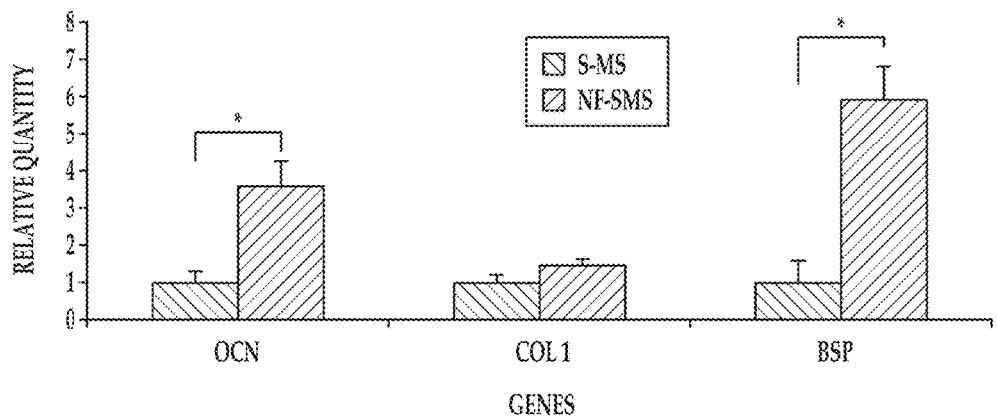
FIG. 22 is a graph illustrating the odontogenic gene expression of DPSC on solid microspheres and nanofibrous spongy microspheres (NF-SMS) after 4 weeks of induction.

To evaluate odontogenic differentiation of DPSCs seeded on S-MS and NF-SMS, gene expression levels of bone sialoprotein (BSP), osteocalcin (OCN) and collagen type 1 (COL1) were detected by real-time PCR (FIG. 22). Total RNA was extracted using RNA Mini kit (Qiagen, Valencia, Calif.) and the first-strand cDNA was reverse transcribed using SuperScript® II Reverse Transcriptase (Invitrogen). Real-time PCR quantification of the rnRNA of BSP, OCN, COL1A1 gene was performed in a 7500 Real-Time PCR System (Applied Biosystetns) by using Taqman probe. As shown in FIG. 22, the expression levels of BSP, OCN and collagen type 1 was increased on NF-SMS compared to S-MS.

In Vivo

The animal surgery procedure used in this example was approved by the University Committee on Use and Care of Animals (UCUCA) at the University of Michigan. Six nude mice (nu/nu) with an age range of 8 wks (Charles River Laboratories, Wilmington, Mass.) were used in this study. Surgery was performed under general inhalation anesthesia with 2% isofluorane. The cell-microspheres were cultured in a odontogenic medium for 7 days before subcutaneous injection. Six samples of each group were injected into nude mice (n=6). Animals were euthanized and samples were retrieved after 6 weeks of injection. Harvested specimens were immediately fixed in 10% formalin for 24 hours for histological examination. The specimens were processed for paraffin embedding and sectioning for staining (i.e., H & E staining (FIGS. 23A and 23D), Von-Kossa staining (FIGS. 23B and 23E) and immunohistological staining (FIGS. 23C and 23F). DSPP primary antibodies were used for immunohistological staining.

Figure 23A:
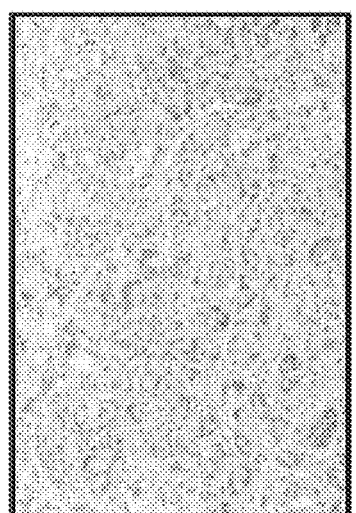
FIGS. 23A through 23C are black and white representations of microscopic observations of stained tissue sections of DPSC-seeded nanofibrous spongy microspheres (NF-SMS) retrieved 6 weeks after implantation in nude mice, where
Figure 23B:
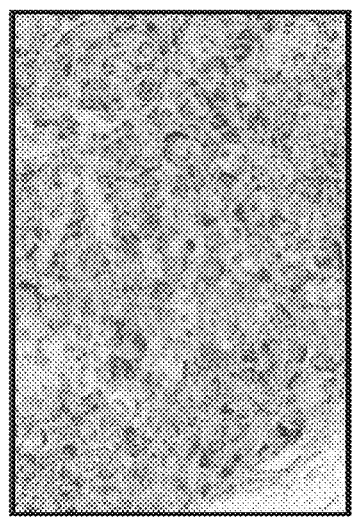
Figure 23C:
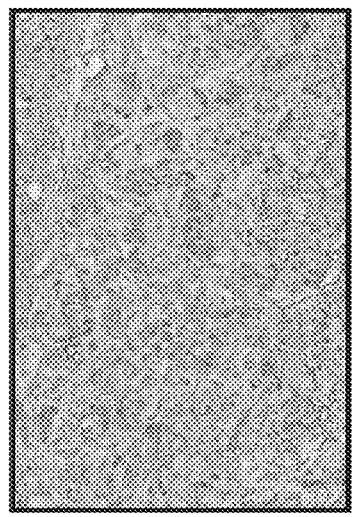
Figure 23D:
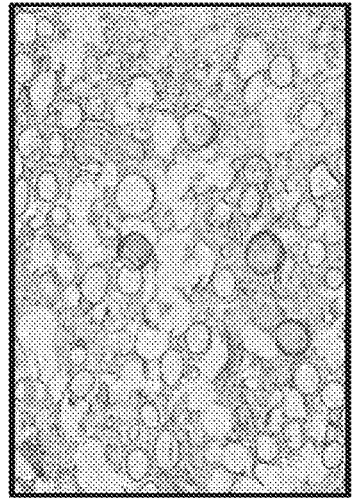
FIGS. 23D through 23F are black and white representations of microscopic observations of stained tissue sections of DPSC-seeded solid microspheres retrieved 6 weeks after implantation in nude mice, where

The histological results showed that DPSCs proliferated on both solid and nanofibrous spongy microspheres (FIGS. 23A and 23D). H-E staining results showed that the tissue in the NF-SMS group (FIG. 23A) consisted of a large amount of cells, and NF-SMS were largely degraded. In the H-E staining results of the S-MS group (FIG. 23D), only a small amount of cells were observed, which was largely due to the fact that most of S-MS were undegraded.

Figure 23E:
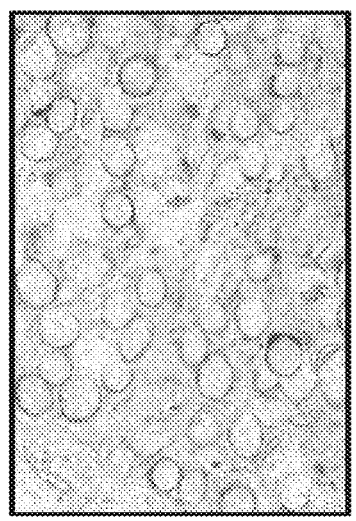
Figure 23F:
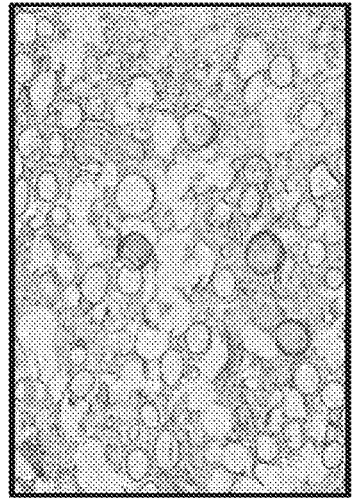

The mineralization level of the formed tissues was measured by Von Kossa staining. According to the results shown in FIG. 23B, mineralized nodules were observed in the NF-SMS group. In contrast, negative staining was observed in the S-MS group (FIG. 23E).

To evaluate odontogenic differentiation of DPSCS in vivo, DSPP immunohistological staining was performed. Comparing FIGS. 23C and 23F, significantly stronger staining was observed in the NF-SMS group (FIG. 23C) than the S-MS group (FIG. 23F), revealing enhanced DPSCs odontogenic differentiation on NF-SMS.

Collectively, the in vitro and in vivo results indicate that NF-SMS could enhance DPSCs proliferation and odontogenic differentiation, showing great promise as desirable cell carriers for dentin tissue engineering.

It is to be understood that the ranges provided herein include the stated range and any value or sub-range within the stated range. For example, a range of about 1 µm to about 100 µm should be interpreted to include not only the explicitly recited limits of 1 µm and 100 µm, but also to include individual values, such as 25 µm, 38 µm, 85.5 µm, etc., and sub-ranges, such as from about 12 µm to about 90 µm; from about 45 µm to about 70 µm, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A nanofibrous spongy microsphere, comprising:
porous walls defining an exterior of the microsphere and extending through an interior of the microsphere, the porous walls consisting of: interconnected polymeric nanofibers selected from the group consisting of a star-shaped poly(L-lactic acid) having X number of hydroxyl groups, wherein X≥4, and having an original hydroxyl density of 1/Y, where Y≥100; a star shaped block copolymer of poly(L-lactic acid) and i) an amino acid or ii) a peptide; and a graft copolymer selected from the group consisting of poly((hydroxyethyl)methacrylate)-graft-poly(L-lactic acid), poly((hydroxyethyl)propylmethacrylate)-graft-poly(L-lactic acid), and poly((hydroxyethyl)butyl acrylate)-graft-poly(L-lactic acid); and spaces formed between the interconnected nanofibers, wherein the spaces are less than 2 µm in diameter; and a plurality of micro-scale pores formed throughout the interior of the microsphere, each of the micro-scale pores i) being partially defined by the porous walls, ii) having an interpore opening that opens to an adjacent micro-scale pore, wherein the interpore opening ranges from about 2 µm to about 80 µm in diameter, and iii) having a diameter ranging from about 1 µm to about 100 µm; wherein a total diameter of the microsphere ranges from about 5 µm to about 1000 µm.

2. The nanofibrous spongy microsphere as defined in claim 1 wherein one of the plurality of micro-scale pores is located at or near a center of the interior of the microsphere and includes a plurality of the openings, each of the plurality of openings having the diameter ranging from about 2 µm to about 80 µm.

3. The nanofibrous spongy microsphere as defined in claim 1 wherein each of the microscale pores includes additional openings, and wherein the additional openings of at least some of the micro-scale pores are adjacent to the exterior of the microsphere.

4. The nanofibrous spongy microsphere as defined in claim 1 wherein the polymeric nanofibers are formed of the star-shaped poly(L-lactic acid) having the X number of hydroxyl groups, wherein X≥4, and having the hydroxyl density ranging from 1/100 to 1/150.

5. The nanofibrous spongy microsphere as defined in claim 4 wherein the star-shaped poly(L-lactic acid) is formed from an initiator having the X number of hydroxyl groups and a L-lactide monomer, wherein a molar ratio, Y, of the L-lactide monomer to the number of hydroxyl groups is 100≤Y≤150.

6. The nanofibrous spongy microsphere as defined in claim 1 wherein the polymeric nanofibers are formed of the star-shaped poly(L-lactic acid) having the X number of hydroxyl groups, wherein X=32 or 64, and having a minimum hydroxyl density of 1/150.

7. The nanofibrous spongy microsphere as defined in claim 1 wherein the polymeric nanofibers are formed of the block copolymer of poly(L-lactic acid) and the amino acid or the peptide.

8. The nanofibrous spongy microsphere as defined in claim 1 wherein the polymeric nanofibers are formed of the poly((hydroxyethyl)methacrylate)-graft-poly(L-lactic acid), the poly((hydroxyethyl)propylmethacrylate)-graft-poly(L-lactic acid), or the poly((hydroxyethyl)butyl acrylate)-graft-poly(L-lactic acid).

9. The nanofibrous spongy microsphere as defined in claim 1, further comprising cells attached to the porous walls.

10. The nanofibrous spongy microsphere as defined in claim 1 wherein the polymeric nanofibers are formed of the star-shaped poly(L-lactic acid) having the X number of hydroxyl groups, wherein X=16, and having a minimum hydroxyl density of 1/100.

11. The nanofibrous spongy microsphere as defined in claim 1 wherein the polymeric nanofibers are formed of the star-shaped poly(L-lactic acid) having the X number of hydroxyl groups, wherein X=4, and having a minimum hydroxyl density of 1/300.

12. A method for making a nanofibrous spongy microsphere, comprising: selecting a polymer from the group consisting of a star-shaped poly(L-lactic acid) having X number of hydroxyl groups, wherein X≥4, and having an original hydroxyl density of 1/Y, where Y≥100; a star shaped block copolymer of poly(L-lactic acid) and i) an amino acid or ii) a peptide; and a graft copolymer selected from the group consisting of poly((hydroxyethyl)methacrylate)-graft-poly(L-lactic acid), poly((hydroxyethyl)propylmethacrylate)-graft-poly(L-lactic acid), and poly((hydroxyethyl)butyl acrylate)-graft-poly(L-lactic acid); dissolving the polymer in a solvent to form a polymer solution; adding the polymer solution into glycerol while stirring the glyercol, thereby emulsifying the polymer solution into polymer solution droplets including multiple glycerol domains entrapped therein; inducing phase separation, thereby forming a polymer skeleton of the nanofibrous spongy microsphere; extracting the glycerol and the solvent from the polymer skeleton, thereby forming the nanofibrous spongy microsphere; and freeze-drying the nanofibrous spongy microsphere, wherein the nanofibrous spongy microsphere includes: porous walls defining an exterior of the microsphere and extending through an interior of the microsphere, the porous walls consisting of: interconnected polymeric nanofibers selected from one of the polymers; spaces formed between the interconnected nanofibers, wherein the spaces are less than 2 µm in diameter; and a plurality of micro-scale pores formed throughout the interior of the microsphere, each of the micro-scale pores i) being partially defined by the porous walls, ii) having an interpore opening that opens to an adjacent micro-scale pore, wherein the interpore opening ranges from about 2 µm to about 80 µm in diameter, and iii) having a diameter ranging from about 1 µm to about 100 µm; wherein a total diameter of the microsphere ranges from about 5 µm to about 1000 µm.

13. The method as defined in claim 12, further comprising maintaining a temperature of the glycerol at about 50° C. while adding the polymer solution.

14. The method as defined in claim 12 wherein the solvent is selected from the group consisting of tetrahydrofuran (THF), dimethyl formamide (DMF), pyridine, THF-methanol, dioxane-methanol, dioxane-water, dioxane-acetone, and dioxane-pyridine.

15. The method as defined in claim 12, further comprising forming the star-shaped poly(L-lactic acid) by:
  selecting an initiator having the X number of hydroxyl groups; and
  polymerizing a L-lactide monomer with the selected initiator, wherein Y is a feed ratio of the L-lactide monomer to the X number of hydroxyl groups of the initiator, and wherein 100≤Y≤150.

16. The method as defined in claim 12, further comprising forming the star-shaped poly(L-lactic acid) by:
  selecting an initiator having the X number of hydroxyl groups;
  polymerizing a L-lactide monomer with the selected initiator to form a precursor star-shaped poly(L-lactic acid) having the original hydroxyl density; and
  performing a hydroxyl doubling reaction on the precursor star-shared poly(L-lactic acid) to form the star-shaped poly(L-lactic acid) having an increased hydroxyl density.

* * * * *

UNITED STATES PATENT AND TRADEMARK OFFICE
CERTIFICATE OF CORRECTION

PATENT NO. : 9,862,807 B2
APPLICATION NO. : 14/507523
DATED : January 9, 2018
INVENTOR(S) : Ma et al.

Page 1 of 1

It is certified that error appears in the above-identified patent and that said Letters Patent is hereby corrected as shown below:

In the Specification

Column 1, Lines 6-9, under "STATEMENT REGARDING FEDERALLY SPONSORED RESEARCH OR DEVELOPMENT," should read --This invention was made with government support under DE022327, DE015384, and DE017689 awarded by the National Institutes of Health, W81XWH-12-2-0008 awarded by the United States Army Medical Research and Materiel Command, and DMR1206575 awarded by the National Science Foundation. The government has certain rights in the invention.--

Signed and Sealed this
Ninth Day of April, 2019

Andrei Iancu
*Director of the United States Patent and Trademark Office*